United States Patent
Kitajima

(10) Patent No.: US 9,894,315 B2
(45) Date of Patent: Feb. 13, 2018

(54) IMAGE CAPTURING APPARATUS, IMAGE PROCESSING APPARATUS AND METHOD, IMAGE PROCESSING SYSTEM, AND CONTROL METHOD FOR IMAGE CAPTURING APPARATUS

(71) Applicant: CANON KABUSHIKI KAISHA, Tokyo (JP)

(72) Inventor: Kotaro Kitajima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 170 days.

(21) Appl. No.: 14/088,970

(22) Filed: Nov. 25, 2013

(65) Prior Publication Data

US 2014/0147091 A1 May 29, 2014

(30) Foreign Application Priority Data

Nov. 29, 2012 (JP) ................................. 2012-261628

(51) Int. Cl.

| H04N 5/77 | (2006.01) |
|---|---|
| H04N 1/60 | (2006.01) |
| H04N 5/202 | (2006.01) |
| H04N 5/222 | (2006.01) |
| H04N 5/76 | (2006.01) |
| H04N 9/73 | (2006.01) |
| G09G 5/02 | (2006.01) |

(Continued)

(52) U.S. Cl.
CPC .............. *H04N 5/772* (2013.01); *H04N 1/60* (2013.01); *H04N 9/8042* (2013.01); *H04N 9/8205* (2013.01); *H04N 9/8227* (2013.01); *H04N 1/4078* (2013.01); *H04N 1/6058* (2013.01)

(58) Field of Classification Search
CPC .... H04N 5/772; H04N 9/8042; H04N 9/8205; H04N 9/8227; G06K 9/54
USPC .............. 386/224; 345/589, 601; 348/223.1, 348/231.6, 254, 333.12; 358/1.9
See application file for complete search history.

(56) References Cited

U.S. PATENT DOCUMENTS

| 8,077,229 | B2 * | 12/2011 | Shinkai ................. | H04N 5/765 348/231.6 |
|---|---|---|---|---|
| 2006/0170701 | A1 * | 8/2006 | Ok .......................... | G09G 5/02 345/601 |

(Continued)

FOREIGN PATENT DOCUMENTS

JP 2009-021827 A 1/2009

*Primary Examiner* — Thai Tran
*Assistant Examiner* — Syed Hasan
(74) *Attorney, Agent, or Firm* — Carter, Deluca, Farrell & Schmidt, LLP

(57) ABSTRACT

An image capturing apparatus comprises: an image sensor configured to sense an image and output image data; an image processing unit configured to perform image processing on the image data; an output unit configured to output the processed image data to an external image processing apparatus; an input unit configured to input first processing information used in image processing performed by the external image processing apparatus on the image data; and a recording unit configured to record the first processing information, second processing information used for converting image data into standard image data, and at least one of the image data processed by the image processing unit and the unprocessed image data, in association with the stated image data.

9 Claims, 16 Drawing Sheets

(51) Int. Cl.
*H04N 9/804* (2006.01)
*H04N 9/82* (2006.01)
*H04N 1/407* (2006.01)

(56) References Cited

U.S. PATENT DOCUMENTS

| | | | |
|---|---|---|---|
| 2008/0018920 A1* | 1/2008 | Kawamoto | H04N 1/603 358/1.9 |
| 2014/0036105 A1* | 2/2014 | Iwaki | H04N 9/67 348/223.1 |

* cited by examiner

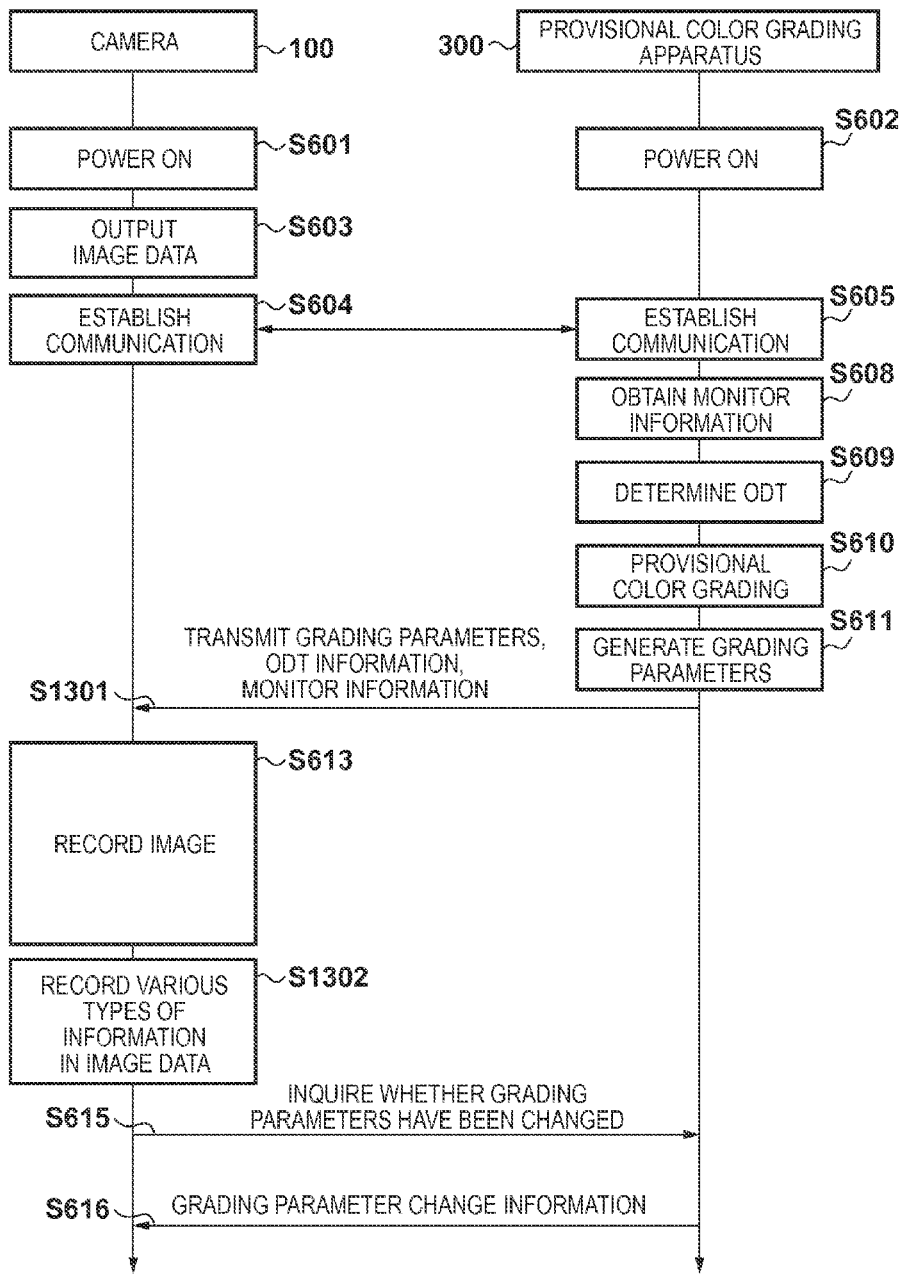

IMAGE CAPTURING APPARATUS, IMAGE PROCESSING APPARATUS AND METHOD, IMAGE PROCESSING SYSTEM, AND CONTROL METHOD FOR IMAGE CAPTURING APPARATUS

BACKGROUND OF THE INVENTION

Field of the Invention

The present invention relates to image capturing apparatuses, image processing apparatuses and methods, image processing systems, and control methods for image capturing apparatus, and particularly relates to image capturing apparatuses, image processing apparatuses and methods, image processing systems, and control methods for image capturing apparatus for performing image processing such as color grading on an image during sensing of the image or after the image has been sensed and recorded.

Description of the Related Art

Conventionally, there are image capturing apparatuses such as digital cameras that capture images of subjects such as people and record those images as moving images. Meanwhile, in addition to cut editing, it has become common, in production facilities such as digital cinema studios, to apply color grading processing that adjusts captured images to a desired appearance. This color grading processing is carried out using a color grading apparatus in an editing studio or the like after image capturing and recording. Rough, provisional color grading is carried out during image sensing when on the set, and final color grading, which involves fine adjustments, is carried out after image sensing and recording. Performing provisional color grading on the set during image sensing in this manner makes it possible to confirm the appearance the image will ultimately have while sensing the image, and furthermore makes it possible to reduce the processing load of the final color grading carried out after image sensing and recording.

When carrying out provisional color grading during image sensing, the digital camera records images and also outputs images to an external color grading apparatus through an HD-SDI cable or the like. The color grading apparatus applies the color grading processing to the inputted images and records color grading parameters (for example, see Japanese Patent Laid-Open No. 2009-21827). Thus an image processing apparatus that records parameter information of provisional color grading carried out during image sensing has been disclosed. Then, the provisional color grading result obtained during image sensing is reproduced in the final color grading after image sensing and recording by applying, to the sensed images, a process based on the provisional color grading parameters recorded during image sensing. Furthermore, a user makes fine adjustments (the final color grading) on the post-provisional color grading image. This makes it possible to reduce the workload involved with the final color grading after image sensing and recording.

Meanwhile, it is often the case during image sensing that the images sensed by the digital camera are recorded in a format with the highest amount of information, such as raw data or the like, and images developed so as to reduce the amount of information, through gamma processing or the like, are then output to the external color grading apparatus. This is because raw data contains a large amount of information and it is thus difficult to transfer raw data in real time over cables such as HD-SDI. However, when the images output to the color grading apparatus differ from the images recorded by the camera, there have been cases where the results of the color grading processing have differed even when applying the same color grading parameters used during image sensing in the color grading after image sensing and recording.

SUMMARY OF THE INVENTION

The present invention has been made in consideration of the above situation, and enables details of a color grading process carried out during image sensing to be reproduced in a color grading process carried out after image sensing and recording even in the case where the data format of a sensed image differs between a format for recording and a format for color grading process carried out during image sensing.

According to the present invention, provided is an image capturing apparatus comprising: an image sensor configured to sense an image and output image data; an image processing unit configured to perform image processing on the image data; an output unit configured to output the processed image data to an external image processing apparatus; an input unit configured to input first processing information used in image processing performed by the external image processing apparatus on the image data; and a recording unit configured to record the first processing information, second processing information used for converting image data into standard image data, and at least one of the image data processed by the image processing unit and the unprocessed image data, in association with the stated image data.

Further, according to the present invention, provided is an image processing apparatus comprising: an input unit configured to input, from an image capturing apparatus, image data and first processing information used in a process for converting the image data into standard image data; a conversion unit configured to convert the image data into the standard image data based on the first processing information; an image processing unit configured to perform predetermined image processing based on a designation from a user on the standard image data obtained by the conversion performed by the conversion unit; and an output unit configured to output second processing information used in the image processing performed by the image processing unit to the image capturing apparatus.

Furthermore, according to the present invention, provided is an image processing apparatus comprising: a readout unit configured to read out the first processing information, the second processing information, and the image data recorded into the recording unit by the aforesaid image capturing apparatus; a conversion unit configured to converts the image data into the standard image data based on the second processing information; a first image processing unit configured to perform the same processing as the processing performed by the external image processing apparatus on the image data, on the standard image data obtained through the conversion performed by the conversion unit, based on the first processing information; and a second image processing unit configured to perform image processing based on a designation from a user on the image data processed by the first image processing unit.

Further, according to the present invention, provided is an image processing system comprising an image capturing apparatus, a first image processing apparatus, and a second image processing apparatus, wherein the image capturing apparatus includes: an image sensor configured to sense an image and output image data; a first image processing unit configured to perform image processing on the image data; a first output unit configured to output the processed image data to the first image processing apparatus; a first input unit configured to input first processing information used in image processing performed by the first image processing apparatus on the image data; and a recording unit configured to record the first processing information, second processing information used for converting image data into standard image data, and at least one of the image data processed by the first image processing unit and the unprocessed image data, in association with the stated image data, the first image processing apparatus includes: a second input unit configured to input the image data output by the first output unit and the second processing information; a first conversion unit configured to convert the image data into standard image data based on the second processing information; a second image processing unit configured to perform predetermined image processing based on a designation from a user on the standard image data obtained by the conversion performed by the first conversion unit; and a second output unit configured to output first processing information used in the image processing performed by the second image processing unit to the image capturing apparatus, and the second image processing apparatus includes: a readout unit configured to read out the first processing information, the second processing information, and the image data recorded by the recording unit; a second conversion unit configured to convert the image data into standard image data based on the second processing information; a third image processing unit configured to perform the same processing as the processing performed by the first image processing apparatus on the image data, on the standard image data obtained through the conversion performed by the second conversion unit, based on the first processing information; and a fourth image processing unit configured to perform image processing based on a designation from the user on the image data processed by the third image processing unit.

Further, according to the present invention, provided is an image processing system comprising an image capturing apparatus, a first image processing apparatus, and a second image processing apparatus, wherein the image capturing apparatus includes: an image sensor configured to sense an image and output image data; a first conversion unit configured to convert the image data into standard image data; a first output unit configured to output the standard image data obtained through the conversion to the first image processing apparatus; a first input unit configured to input first processing information used in image processing performed by the first image processing apparatus on the standard image data; and a recording unit configured to record the first processing information, second processing information used by the first conversion unit, and at least one of the standard image data obtained through the conversion performed by the first conversion unit and unconverted image data, in association with the stated image data, the first image processing apparatus includes: a second input unit configured to input the image data output by the first output unit; a second image processing unit configured to perform predetermined image processing based on a designation from a user on the image data input by the second input unit; and a second output unit configured to output first processing information used in the image processing performed by the second image processing unit to the image capturing apparatus, and the second image processing apparatus includes: a readout unit configured to read out the first processing information, the second processing information, and the image data recorded by the recording unit; a second conversion unit configured to convert the image data into standard image data based on the second processing information; a third image processing unit configured to perform the same processing as the processing performed by the first image processing apparatus on the image data, on the standard image data obtained through the conversion performed by the second conversion unit, based on the first processing information; and a fourth image processing unit configured to perform image processing based on a designation from the user on the image data processed by the third image processing unit.

Further, according to the present invention, provided is a control method for an image capturing apparatus including an image sensor configured to sense an image and output image data, the method comprising: an image processing step of performing image processing on the image data; an output step of outputting the processed image data to an external image processing apparatus; an input step of inputting first processing information used in image processing performed by the external image processing apparatus on the image data; and a recording step of recording the first processing information, second processing information used for converting image data into standard image data, and at least one of the image data processed in the image processing step and the unprocessed image data, in association with the stated image data.

Further, according to the present invention, provided is an image processing method comprising: an input step of inputting, from an image capturing apparatus, image data and first processing information used in a process for converting the image data into standard image data; a conversion step of converting the image data into the standard image data based on the first processing information; an image processing step of performing predetermined image processing based on a designation from a user on the standard image data obtained by the conversion performed in the conversion step; and an output step of outputting second processing information used in the image processing performed in the image processing step to the image capturing apparatus.

Further, according to the present invention, provided is an image processing method comprising: a readout step of reading out the first processing information, the second processing information, and the image data recorded into the recording unit by the aforesaid image capturing apparatus; a conversion step of converting the image data into the standard image data based on the second processing information; a first image processing step of performing the same processing as the processing performed by the external image processing apparatus on the image data, on the standard image data obtained through the conversion performed in the conversion step, based on the first processing information; and a second image processing step of performing image processing based on a designation from a user on the image data processed in the first image processing step.

Further, according to the present invention, provided is an image processing method performed by an image processing system including an image capturing apparatus having an image sensor configured to sense an image and outputs image data, a first image processing apparatus, and a second image processing apparatus, wherein the image capturing apparatus executes: a first image processing step of performing image processing on the image data; a first output step of outputting the processed image data to the first image processing apparatus; a first input step of inputting first processing information used in image processing performed by the first image processing apparatus on the image data; and a recording step of recording the first processing information, second processing information used for converting image data into standard image data, and at least one of the image data processed in the first image processing step and the unprocessed image data, in association with the stated image data, the first image processing apparatus executes: a second input step of inputting the image data output in the first output step and the second processing information; a first conversion step of converting the image data into the standard image data based on the second processing information; a second image processing step of performing predetermined image processing based on a designation from a user on the standard image data obtained by the conversion performed in the first conversion step; and a second output step of outputting first processing information used in the image processing performed in the second image processing step to the image capturing apparatus, and the second image processing apparatus executes: a readout step of reading out the recorded first processing information, second processing information, and image data; a second conversion step of converting the image data into the standard image data based on the second processing information; a third image processing step of performing the same processing as the processing performed by the first image processing apparatus on the image data, on the standard image data obtained through the conversion performed in the second conversion step, based on the first processing information; and a fourth image processing step of performing image processing based on a designation from the user on the image data processed in the third image processing step.

Further, according to the present invention, provided is an image processing method performed by an image processing system including an image capturing apparatus having an image sensor configured to sense an image and outputs image data, a first image processing apparatus, and a second image processing apparatus, wherein the image capturing apparatus executes: a first conversion step of converting the image data into standard image data; a first output step of outputting the image data obtained through the conversion to the first image processing apparatus; a first input step of inputting first processing information used in image processing performed by the first image processing apparatus on the image data; and a recording step of recording the first processing information, second processing information used in the first conversion step, and at least one of the standard image data obtained through the conversion performed in the first conversion step and unconverted image data, in association with the stated image data, the first image processing apparatus executes: a second input step of inputting the image data output in the first output step; a second image processing step of performing predetermined image processing based on a designation from a user on the image data input in the second input step; and a second output step of outputting first processing information used in the image processing performed in the second image processing step to the image capturing apparatus, and the second image processing apparatus executes: a readout step of reading out the recorded first processing information, second processing information, and image data; a second conversion step of converting the image data into the standard image data based on the second processing information; a third image processing step of performing the same processing as the processing performed by the first image processing apparatus on the image data, on the standard image data obtained through the conversion performed in the second conversion step, based on the first processing information; and a fourth image processing step of performing image processing based on a designation from the user on the image data processed in the third image processing step.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 16 is a sequence chart illustrating a flow of communication between the digital camera and the provisional color grading apparatus, and the flow of an image sensing process, according to the third embodiment.

DESCRIPTION OF THE EMBODIMENTS

Exemplary embodiments of the present invention will be described in detail in accordance with the accompanying drawings.

Here, a case where the camera records images in the raw format, develops the images using given development parameters A, and outputs the developed images to the color grading apparatus during image sensing will be described as an example. During image sensing, the color grading apparatus applies a provisional color grading process to the images developed using the development parameters A, and records the color grading parameters. Then, when performing the final color grading after image sensing and recording, the color grading apparatus receives data obtained by developing the sensed raw data (or data developed by the color grading apparatus itself), and carries out processing in accordance with the recorded provisional color grading parameters.

At this time, if the user does not manage the process sufficiently, it is possible for the parameters used in the development process performed by the color grading apparatus after image sensing and recording to differ from the development parameters A used during image sensing. This leads to a problem in that an image that matches the provisional color grading result during image sensing cannot be obtained by the final color grading even if the same color grading parameters are employed during the image sensing and after image sensing and recording.

First Embodiment

First, an image capturing apparatus and an image processing system according to a first embodiment of the present invention will be described with reference to FIGS. 1 through 10. The first embodiment describes an image capturing apparatus that performs image processing equivalent to color grading in a camera during image sensing and records color grading parameters.

Figure 1:
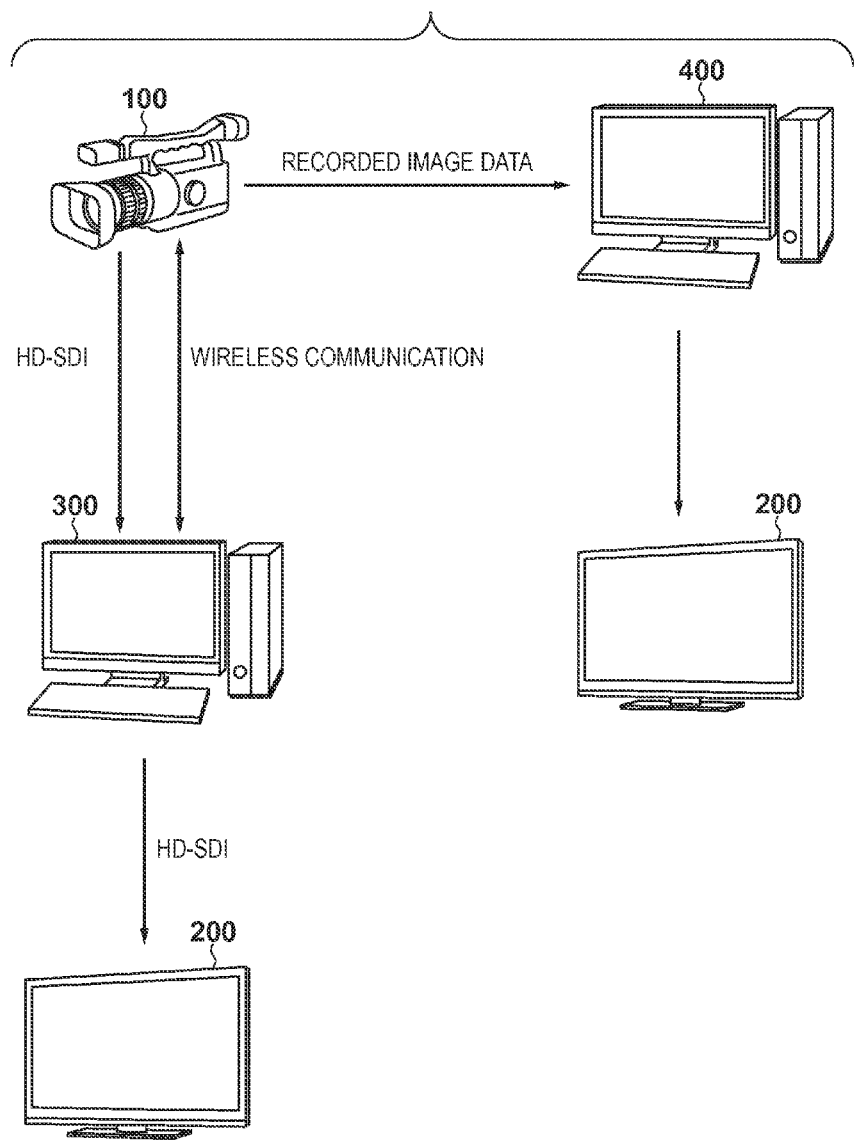
FIG. 1 is a diagram illustrating a configuration of an image processing system according to an embodiment of the present invention.

FIG. 1 is a block diagram illustrating the configuration of the image processing system according to the first embodiment of the present invention. As shown in FIG. 1, the image processing system includes a digital camera 100 serving as the image capturing apparatus, monitors 200 that display images, a provisional color grading apparatus 300, and a final color grading apparatus 400. The provisional color grading apparatus 300 applies provisional color grading processing such as color/luminance correction to an image sensed by the camera 100 during image sensing. The final color grading apparatus 400 applies final color grading processing to a recorded image.

The camera 100 senses an image of a subject and records image data of the sensed image onto a recording medium, and also outputs sensed images to the provisional color grading apparatus 300 during image sensing. The provisional color grading apparatus 300 performs the provisional color grading processing on an input image that is being sensed, roughly adjusts the appearance of the image, and outputs the post-provisional color grading image to the monitor 200.

On the other hand, the final color grading apparatus 400 loads image data sensed by the camera 100 from the recording medium. The final color grading apparatus 400 then applies the provisional color grading processing to the loaded image data based on color grading information output by the provisional color grading apparatus 300 (mentioned later). Furthermore, the final color grading apparatus 400 performs fine adjustments (the final color grading processing) on the appearance of the post-provisional color grading processing image and outputs an image resulting from the color grading processing to the monitor 200. Note that the monitor 200 connected to the provisional color grading apparatus 300 and the monitor 200 connected to the final color grading apparatus 400 may be different monitors or may be the same monitor.

Figure 2:
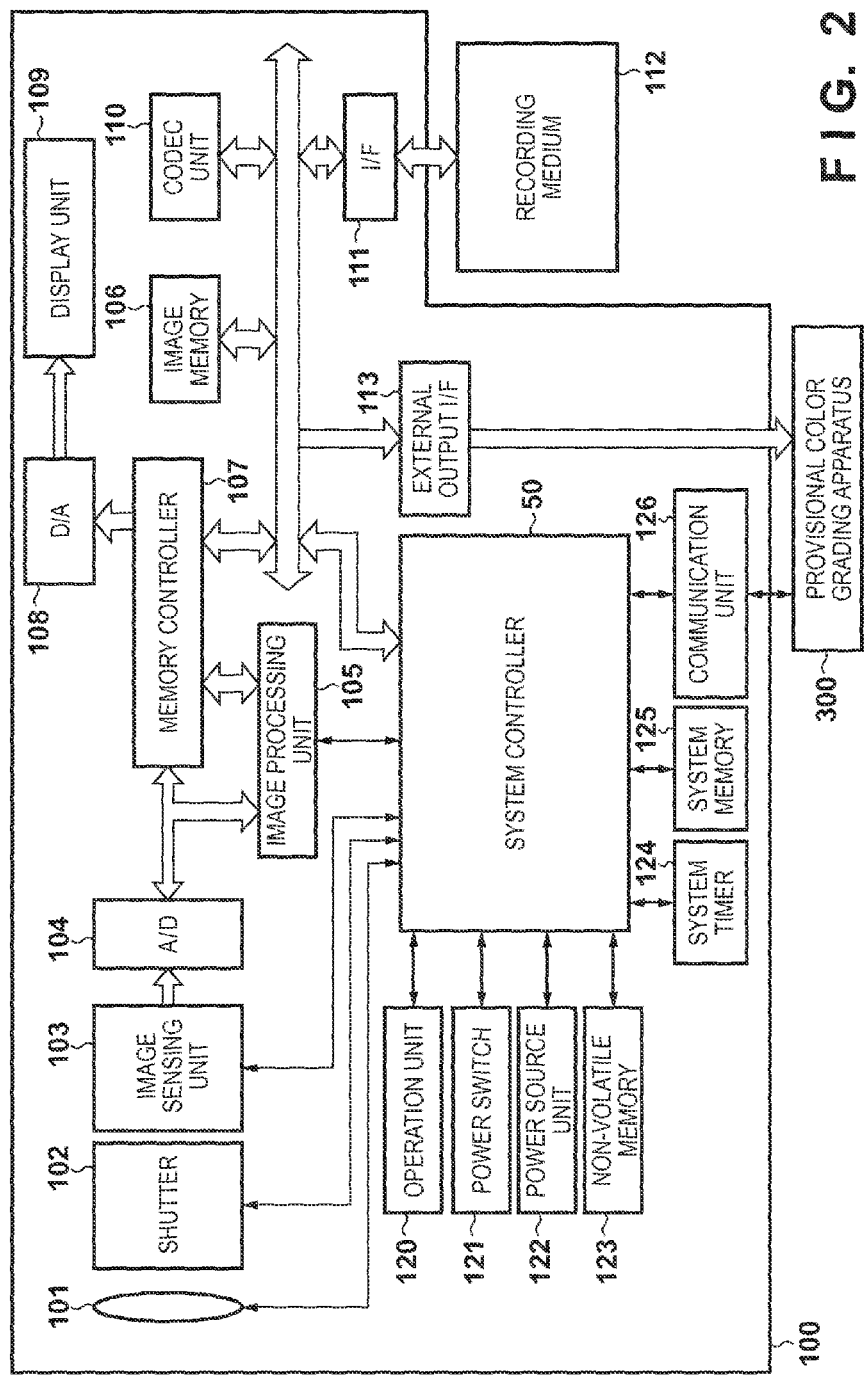
FIG. 2 is a block diagram illustrating a configuration of a digital camera according to an embodiment.

FIG. 2 is a block diagram illustrating the configuration of the digital camera 100. The flow of a basic process performed by the digital camera 100 when sensing an image of a subject will be described with reference to FIG. 2. An image sensing unit 103 is configured of a CCD sensor, a CMOS sensor, or the like that converts an optical image into an electrical signal; the image sensing unit 103 performs photoelectric conversion on light that enters through a lens group 101, including a zoom lens and a focus lens, and a shutter 102 having aperture functionality, and outputs the result of the conversion to an A/D converter 104 as an input image signal. The A/D converter 104 converts an analog image signal output from the image sensing unit 103 into a digital image signal, and outputs the digital image signal to an image processing unit 105.

The image processing unit 105 performs various types of image processing, including color conversion processing such as white balance processing, γ processing, color correction processing, and so on, on the image data from the A/D converter 104 or image data read out from an image memory 106 via a memory controller 107. Note that details of the processing performed by the image processing unit 105 will be given later. Meanwhile, the image processing unit 105 performs predetermined computational processing using the sensed image data, and a system controller 50 performs exposure control and focus control based on results obtained from these computations. Through-the-lens (TTL) autofocus (AF) processing, autoexposure (AE) processing, and so on are carried out as a result. In addition, as the aforementioned white balance processing, the image processing unit 105 presumes a light source using the sensed image data through a process that will be described later, and carries out auto white balance (AWB) processing based on the presumed light source.

The image data output from the image processing unit 105 is written into the image memory 106 via the memory controller 107. The image memory 106 stores image data output from the image sensing unit 103, image data for display in a display unit 109, and the like.

A D/A converter 108 converts image data for display stored in the image memory 106 into an analog signal and supplies that analog signal to the display unit 109, and the display unit 109 carries out a display, in a display panel such as an LCD, based on the analog signal from the D/A converter 108. Meanwhile, the image data stored in the image memory 106 can also be output to the external provisional color grading apparatus 300 via an external output interface (I/F) 113.

A codec unit 110 compresses and encodes the image data stored in the image memory 106 based on standards such as the MPEG standard. The system controller 50 stores the encoded image data or uncompressed image data in a recording medium 112, such as a memory card, a hard disk, or the like, via an interface (I/F) 111. Meanwhile, in the case where image data read out from the recording medium 112 is compressed, the codec unit 110 decodes the image data and stores the decoded image data in the image memory 106.

In addition to the aforementioned basic operations, the system controller 50 implements the various processes according to the first embodiment, mentioned later, by executing programs recorded in a non-volatile memory 123. The non-volatile memory 123 is a memory that can be recorded to and deleted electrically, and an EEPROM, for example, is used for the non-volatile memory 123. Here, "programs" refers to programs for executing the content of the various flowcharts and sequence charts according to the first embodiment, which will be described later. At this time, operational constants and variables of the system controller 50, programs read out from the nonvolatile memory 123, and the like are loaded into a system memory 125.

Meanwhile, as shown in FIG. 2, the camera 100 includes an operation unit 120 for inputting various types of operational designations, a power switch 121, and a power source unit 122. Furthermore, the camera 100 includes a system timer 124 that measures times used in various types of control, measures the time of an internal clock, and so on, and a communication unit 126 that communicates wirelessly with external devices, including the provisional color grading apparatus 300.

Figure 3:
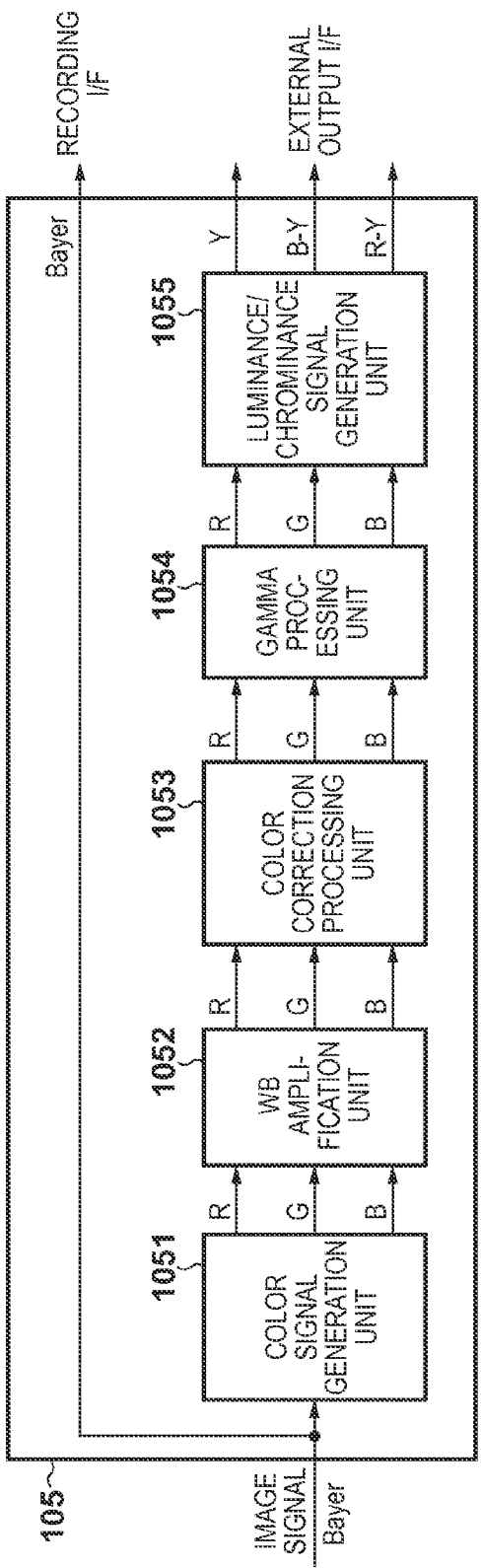
FIG. 3 is a block diagram illustrating a configuration of an image processing unit in a digital camera according to first and second embodiments.

FIG. 3 is a block diagram illustrating the configuration of the image processing unit 105. Processing performed by the image processing unit 105 according to the present first embodiment will be described with reference to FIG. 3. As shown in FIG. 3, an image signal from the A/D converter 104 shown in FIG. 2 is input into the image processing unit 105. The image signal input into the image processing unit 105 is input into a color signal generation unit 1051 as RGB Bayer array raw image data. In the case where an image is to be recorded directly as raw image data, the image signal input into the image processing unit 105 is output as-is. The output image signal can be recorded on the recording medium 112 via the I/F 111. The color signal generation unit 1051 generates R, G, and B color signals from the input RGB Bayer array raw image data, for all pixels. The color signal generation unit 1051 outputs the generated R, G, and B color signals to a WB amplification unit 1052.

Based on a white balance gain value calculated by the system controller 50, the WB amplification unit 1052 adjusts the white balance of the respective R, G, and B color signals by applying a gain thereto. A color correction processing unit 1053 corrects the color tones of the post-white balance processing R, G, and B color signals by carrying out 3×3 matrix processing, three-dimensional look-up table (LUT) processing, or the like thereon. Furthermore, a gamma processing unit 1054 carries out gamma correction such as applying gamma according to a specification such as Rec. 709, log-format gamma, or the like, and a luminance/chrominance signal generation unit 1055 generates a luminance signal Y and chrominance signals R-Y and B-Y from the color signals R, G, and B. The luminance/chrominance signal generation unit 1055 outputs the generated luminance signal Y and chrominance signals R-Y and B-Y to the external output I/F 113 and the recording I/F 111. The recording I/F 111 records the RGB Bayer array raw image data or the luminance signal Y and chrominance signals R-Y and B-Y on the recording medium 112 by controlling signals exchanged with the recording medium 112. In addition, the external output I/F 113 transforms an input image signal into a format that can be transferred as an HD-SDI signal and outputs that image signal to the provisional color grading apparatus 300.

Figure 4:
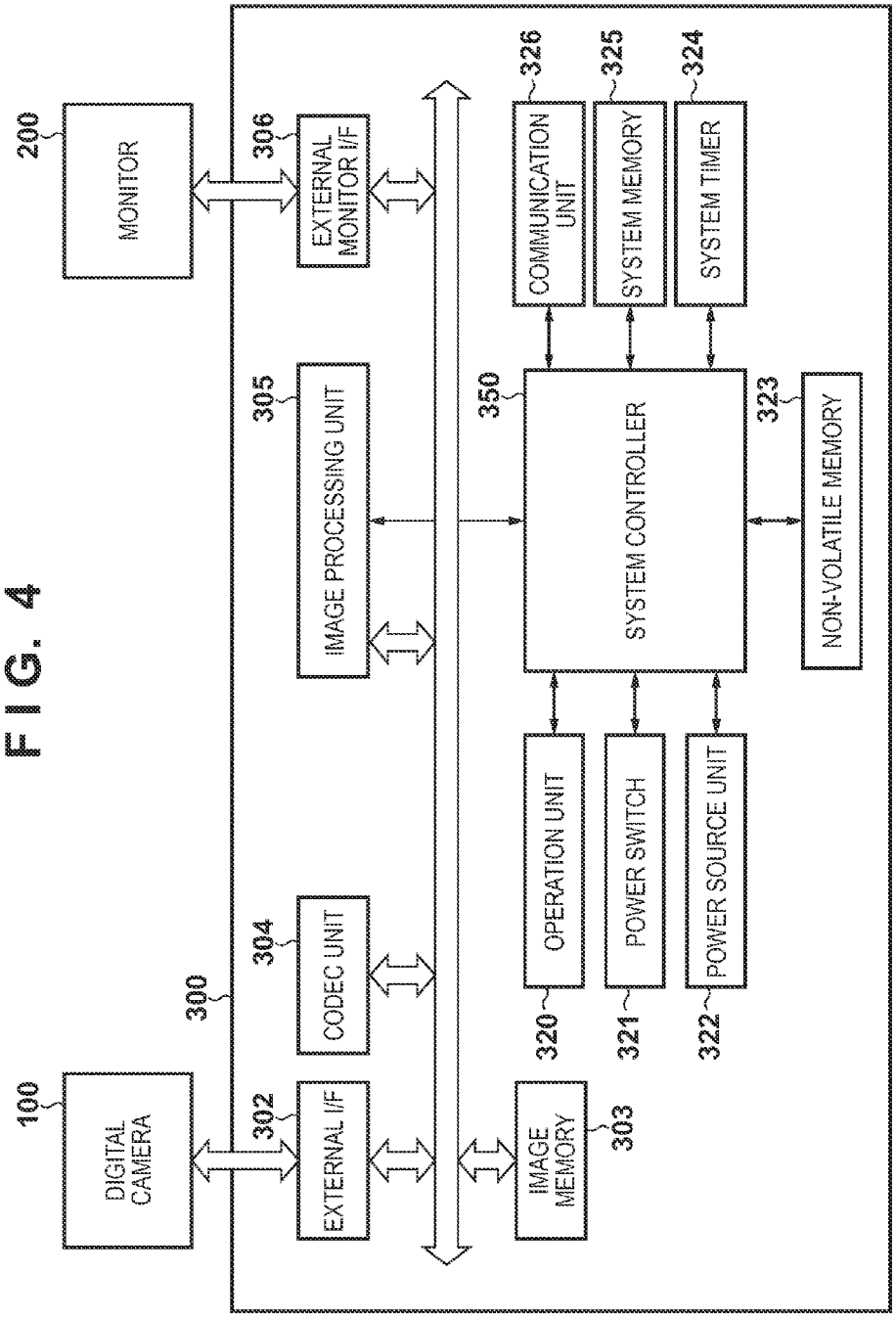
FIG. 4 is a block diagram illustrating a configuration of a provisional color grading apparatus according to an embodiment.

Next, the configuration of and operations performed by the provisional color grading apparatus 300 will be described. FIG. 4 is a block diagram illustrating the configuration of the provisional color grading apparatus 300. First, the basic flow of image processing performed by the provisional color grading apparatus 300 will be described with reference to FIG. 4. Here, the flow of provisional color grading processing performed on image data input via external output I/F 113 of the camera 100 will be described.

A system controller 350 stores an image signal from the camera 100, input via an external I/F 302, in an image memory 303. The system controller 350 determines parameters to be used by an image processing unit 305 in response to operations made by the user through an operation unit 320 configured of a mouse, a keyboard, a touch panel, or the like, and sets those parameters in the image processing unit 305. The image processing unit 305 carries out image processing, including the provisional color grading, in accordance with the set parameters and stores a result of the image processing in the image memory 303. Meanwhile, the system controller 350 reads out the processed image from the image memory 303 and outputs that image to the monitor 200 via an external monitor I/F 306.

Note that as shown in FIG. 4, the provisional color grading apparatus 300 includes a codec unit 304 that encodes/decodes the image data, a power switch 321, a power source unit 322, and a non-volatile memory 323 that can be recorded to and deleted electrically. Furthermore, the provisional color grading apparatus 300 includes a system timer 324 that measures times used in various types of control, measures the time of an internal clock, and so on, and a system memory 325 into which operational constants and variables of the system controller 350, programs read out from the non-volatile memory 323, and the like are loaded. The provisional color grading apparatus 300 also includes a communication unit 326 that communicates wirelessly with external devices including the camera 100.

Figure 5:
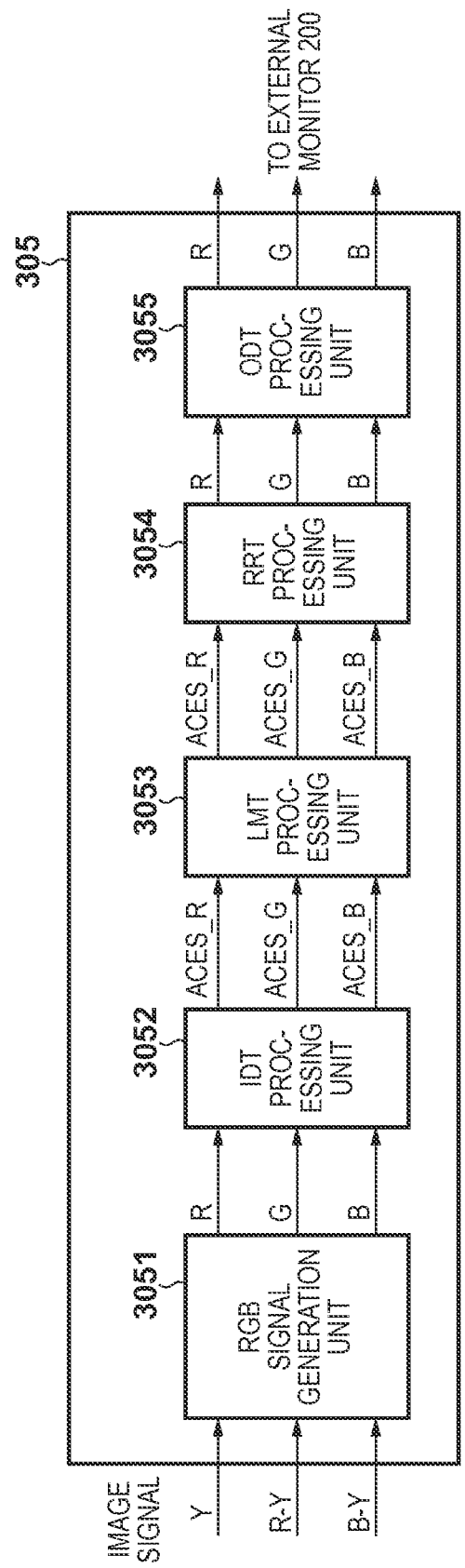
FIG. 5 is a block diagram illustrating a configuration of an image processing unit in the provisional color grading apparatus according to the first and second embodiments.

Next, processing carried out by the image processing unit 305 of the provisional color grading apparatus 300 will be described using FIG. 5. FIG. 5 is a block diagram illustrating the image processing unit 305 in detail. As described earlier, image data (the luminance signal Y and chrominance signals R-Y and B-Y) received from the camera 100 via the external I/F 302 and stored in the image memory 303 is input into an RGB signal generation unit 3051 under the control of the system controller 350. The luminance/chrominance signals (Y, R-Y, and B-Y signals) input into the RGB signal generation unit 3051 are converted into RGB signals. The generated RGB signals are then output to an Input Device Transform (IDT) processing unit 3052. The IDT processing unit 3052 converts the input RGB signals into RGB signals that will serve as a standard.

The present first embodiment assumes the Academy Color Encode Specification (ACES) standard proposed by the Academy of Motion Picture Arts and Sciences (AMPAS) is used as the standard for the RGB signals serving as the standard. In other words, a process for converting the input RGB signals into ACES_RGB signals according to the ACES standard is carried out. The ACES_RGB signals are linear with respect to the luminance of the subject, and have faithful color reproduction properties with respect to the subject. The process for conversion into the ACES_RGB signals is configured of de-gamma processing, color reproducibility correction processing, and color space conversion processing. The parameters for the process of converting into ACES_RGB are determined in accordance with the properties of the image processing unit 105 in the camera 100 and in accordance with the light source properties during image sensing; details will be given later. The IDT processing unit 3052 outputs the post-conversion ACES_RGB signals to a Look Modification Transform (LMT) processing unit 3053.

The LMT processing unit 3053 carries out provisional color grading processing in accordance with user operations made through the operation unit 320. Specifically, in accordance with user operations made through the operation unit 320, the LMT processing unit 3053 determines parameters for tone curve adjustments, matrix processes, and so on to be performed on the ACES_RGB signals, and carries out processing in accordance with the determined parameters. As a result, image processing resulting in an appearance desired by the user is carried out. The LMT processing unit 3053 outputs the image signals that have undergone the provisional color grading processing to a Reference Rendering Transform (RRT) processing unit 3054.

Based on the ACES standard, the RRT processing unit 3054 applies to the input image signals image processing that causes the image signals to take on a film-tone appearance to serve as a standard, and outputs the processed images to an Output Device Transform (ODT) processing unit 3055. The ODT processing unit 3055 converts the input image signals into image signals that fall within the color gamut of the monitor 200. For example, if the connected monitor 200 is a monitor compliant with the Rec. 709 standard, the input signals are converted into signals that fall within the Rec. 709 color gamut, after which gamma processing is applied according to the Rec. 709 standard. The ODT processing unit 3055 outputs the converted image data to the monitor 200 via the external monitor I/F 306.

The stated combination of the camera 100, the provisional color grading apparatus 300, and the monitor 200 makes it possible for the user to perform provisional color grading during image sensing that causes the image displayed in the monitor 200 to approach a target appearance.

Figure 6:
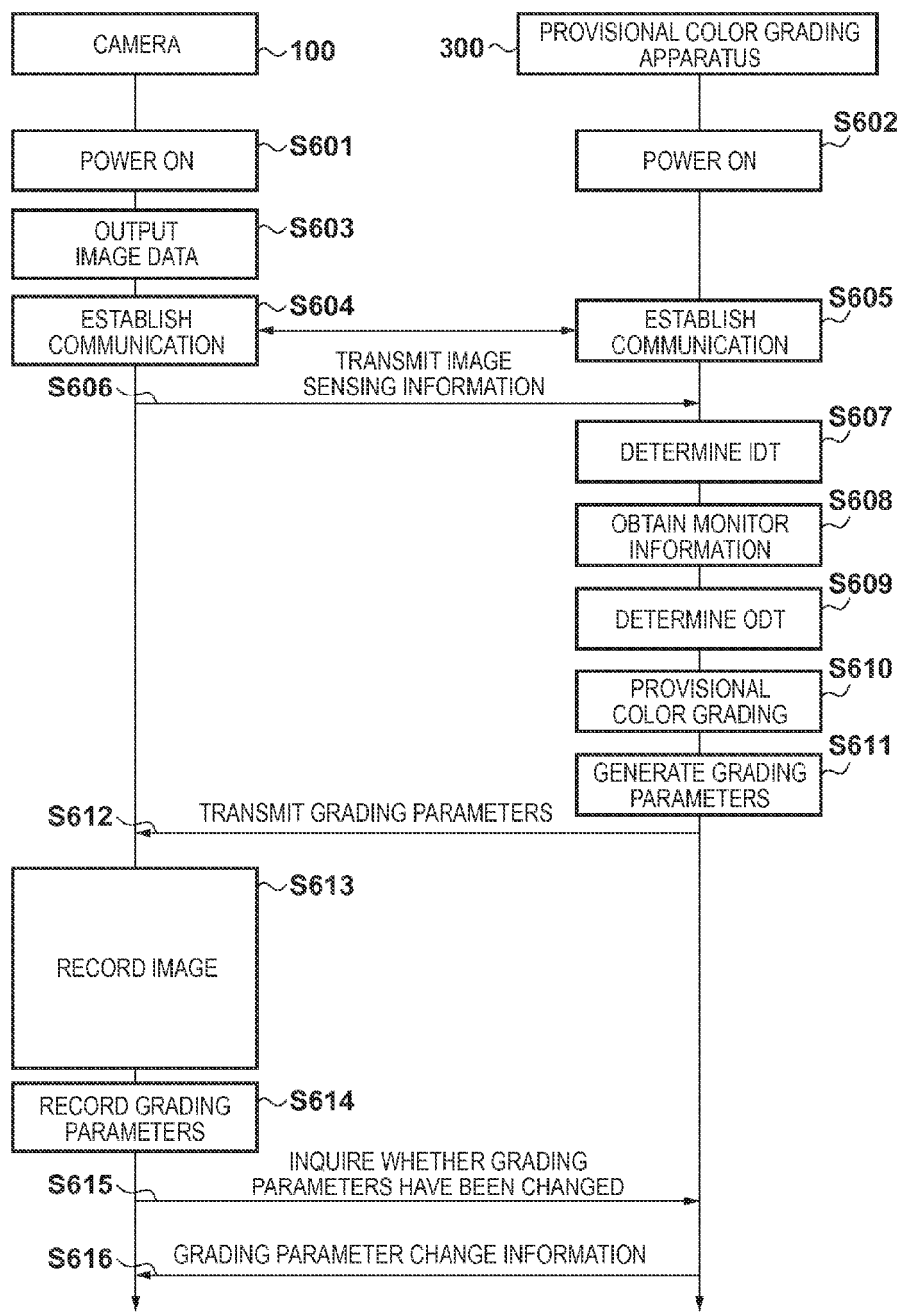
FIG. 6 is a sequence chart illustrating a flow of communication between the digital camera and the provisional color grading apparatus, and a flow of an image sensing process, according to the first embodiment.

Next, processing through which the camera 100 and the provisional color grading apparatus 300 communicate and exchange color grading information will be described with reference to FIG. 6. FIG. 6 is a sequence chart illustrating the flow of communication between the camera 100 and the provisional color grading apparatus 300, and the flow of an image sensing process, from when those devices are turned on to when image sensing is carried out. The vertical axis in FIG. 6 indicates the flow of time.

In S601 of FIG. 6, when the user turns the camera 100 on by operating the power switch 121, the camera 100 starts up. Likewise, in S602, when the user turns the provisional color grading apparatus 300 on by operating the power switch 321, the provisional color grading apparatus 300 starts up.

After the startup, in S603, the system controller 50 of the camera 100 starts the aforementioned image sensing process. The image data (luminance/chrominance signals) captured through the image sensing process are output to the provisional color grading apparatus 300 via the external output I/F 113. In S604, the system controller 50 of the camera 100 carries out a process for establishing communication with the provisional color grading apparatus 300 via the communication unit 126. In S605, the system controller 350 of the provisional color grading apparatus 300 carries out a process for establishing communication with the camera 100 via the communication unit 326, in the same manner as the process performed in S604.

When a state of communication is successfully established in S604 and S605, the camera 100 transmits image sensing information to the provisional color grading apparatus 300 in S606. Here, the "image sensing information" is information that affects the tint, gradation properties, and so on of images sensed by the camera 100, such as a model name of the camera, information of the light source illuminating the subject, gamma information, ISO sensitivity settings of the camera, information of the lens being used, and so on.

In S607, the system controller 350 of the provisional color grading apparatus 300 determines IDT parameters based on the obtained image sensing information, and sets the determined parameters in the IDT processing unit 3052. The process for determining the IDT parameters will be described in detail here. In the provisional color grading, a plurality of sets of IDT parameters are held in advance for each instance of camera information, and the IDT parameters are selected in accordance with the camera information. As described earlier, the IDT processing is roughly configured of three processes, namely de-gamma processing, processing for correcting colors to have tints corresponding to a color standard, and conversion into the ACES color space.

The de-gamma processing is processing for selecting parameters resulting in the inverse of the gamma properties of the camera 100, by referring to gamma property information of the camera 100 in the image sensing information.

The color correction processing is processing for determining color correction parameters by referring to camera information that causes changes in the color balance, such as light sources, lens colors, and so on. For example, in the case where light source information is used as the image sensing information, parameters for color reproduction based on the ACES standard are prepared in advance for a plurality of light sources, such as daytime sunlight, illuminant A, and so on. Parameters corresponding to the light source information obtained from the camera 100 are then selected.

The color space conversion processing determines parameters by referring to the model of the camera 100, color space setting information for the camera 100, and so on. For example, information as to whether the camera 100 is outputting signals based on the Rec. 709 standard or is outputting signals based on the DCI standard is obtained. Parameters for converting from those color spaces into the ACES color space are then selected.

In S608, the system controller 350 of the provisional color grading apparatus 300 obtains monitor information regarding the monitor 200 via the external monitor I/F 306. The "monitor information" referred to here is information indicating the display standard being used for display by the monitor 200 connected to the provisional color grading apparatus 300. sRGB, Rec. 709, DCI, and so on are examples of the monitor information. In S609, the system controller 350 of the provisional color grading apparatus 300 determines parameters for the ODT processing based on the monitor information obtained in S608, and sets the determined parameters in the ODT processing unit 3055. In the ODT processing, parameter sets are prepared for each monitor output standard, and the parameters are selected in accordance with the output standard of the monitor 200.

In S610, the system controller 350 of the provisional color grading apparatus 300 determines parameters for the LMT processing based on user operations made through the operation unit 320, and sets the determined parameters in the LMT processing unit 3053. The LMT processing unit 3053 carries out the LMT processing using the set parameters.

In S611, provisional color grading parameters, including all of the details of the processing performed by the LMT processing unit 3053, are generated. The provisional color grading parameters may be information in which the details of the processing performed in the LMT processing and all of the processing parameters thereof are recorded, or may be generated in three-dimensional LUT (look up table) format that consolidates the entire series of processes. The present embodiment describes a method in which the provisional color grading parameters are generated as a three-dimensional LUT.

In S612, the system controller 350 of the provisional color grading apparatus 300 transmits the generated provisional color grading parameters to the camera 100 via the communication unit 326. In S613, the image data sensed by the camera 100 is recorded on the recording medium 112. When the image data has been successfully recorded, in S614, the system controller 50 of the camera 100 records the received provisional color grading parameters in the image file as metadata (appended information).

Figure 7:
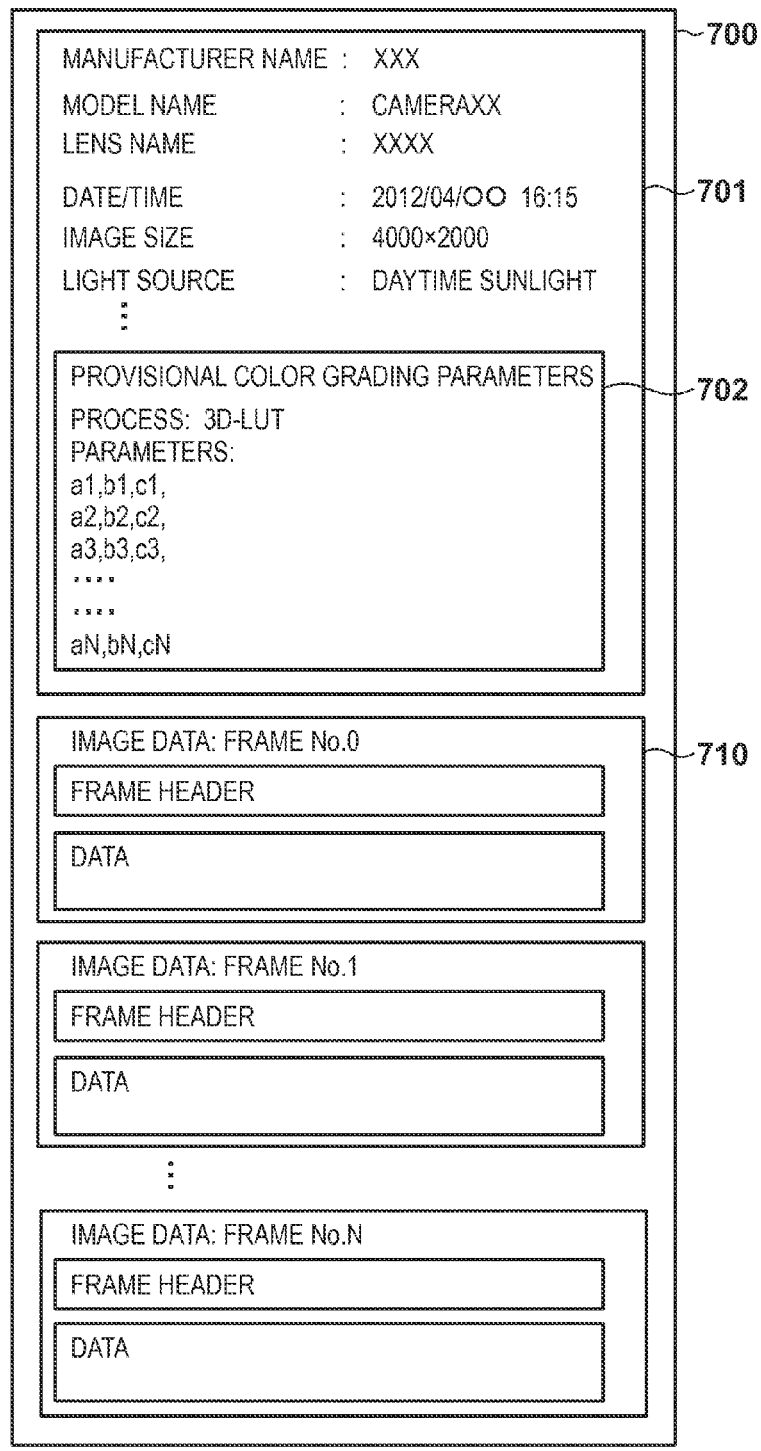
FIG. 7 is a block diagram illustrating an example of a structure of an image file according to the first embodiment.

An example of an image file that includes the metadata will now be described using FIG. 7. FIG. 7 illustrates the structure of a file recorded by the camera 100. An image file 700 contains metadata 701 including color grading parameters 702, and image frame data 710. As illustrated in FIG. 7, in the present embodiment, the metadata 701 is recorded in a header portion of the image file 700, and the metadata 701 contains the provisional color grading parameters 702. A manufacturer name of the camera 100, a model name of the camera 100, a lens name, light source information, and so on are written in the metadata. Meanwhile, the provisional color grading parameters 702 are, as described earlier, 3D-LUT format data.

The foregoing describes the series of communication and image sensing processes performed when the camera 100 senses an image and the provisional color grading apparatus 300 then performs the provisional color grading processing. The procedure advances to S615 in FIG. 6 in the case where further image sensing is to be carried out. In S615, the system controller 50 of the camera 100 inquires with the provisional color grading apparatus 300 as to whether or not the provisional color grading parameters have been changed, via the communication unit 126.

In S616, the system controller 350 of the provisional color grading apparatus 300 transmits change information of the provisional color grading parameters to the camera 100. The "change information" of the provisional color grading parameters is comparison information between the provisional color grading parameters transmitted in S612 and the provisional color grading parameters set in the LMT processing unit 3053 thereafter. Specifically, information indicating whether or not the provisional color grading parameters have been changed, as well as new provisional color grading parameters in the case where the provisional color grading parameters have been changed, are transmitted to the camera 100. The timing at which the provisional color grading parameters are changed corresponds to color grading properties being changed by the user after image sensing and recording (that is, after S613).

Although not illustrated in FIG. 6, the camera 100 records images based on the obtained color grading change information thereafter. In other words, in the case where the color grading information has been changed, the camera 100 records the new color grading parameters as the metadata of the image data.

Figure 8:
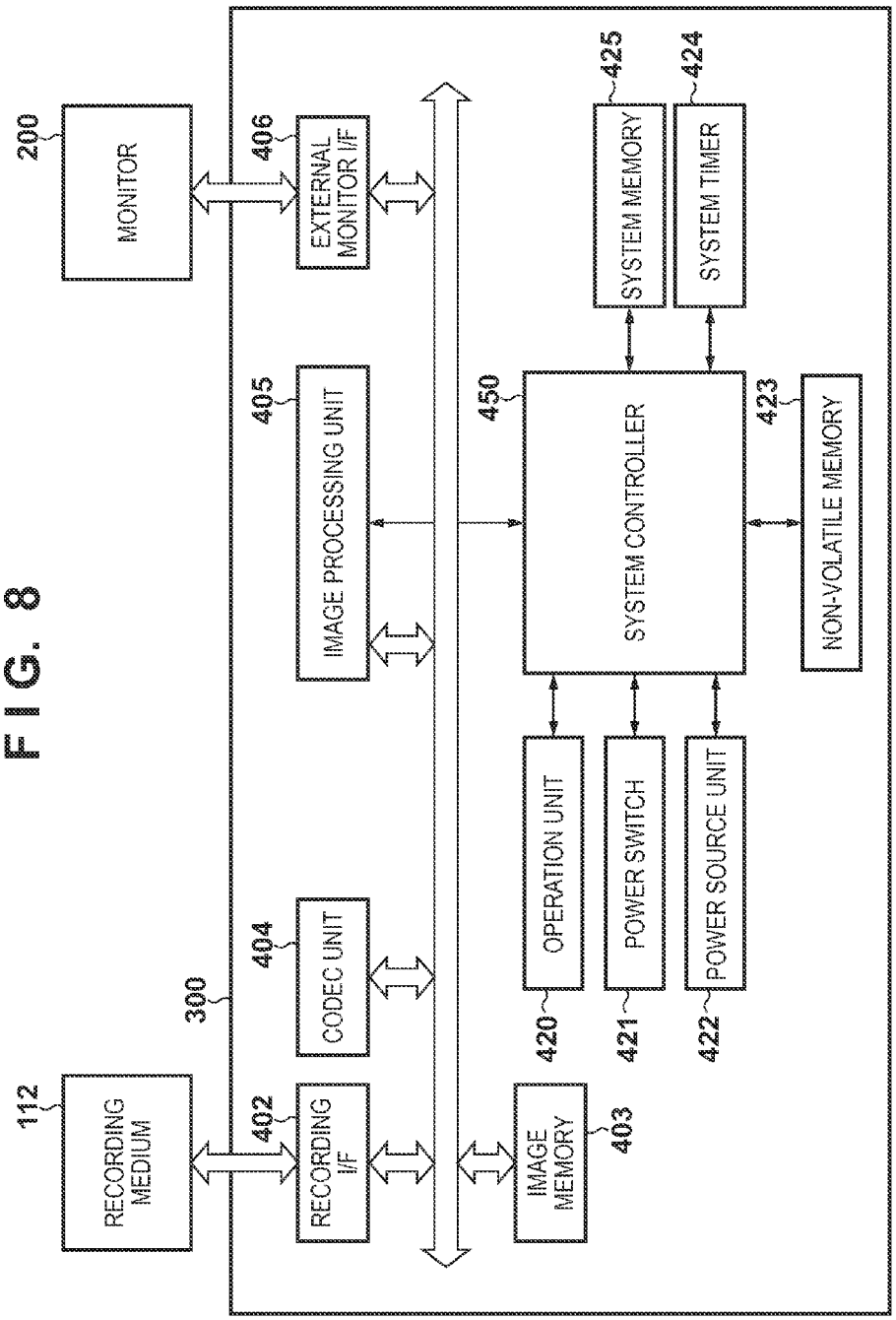
FIG. 8 is a block diagram illustrating a configuration of a final color grading apparatus according to an embodiment.

Next, processing through which image data recorded by the camera 100 as described above is imported into the final color grading apparatus 400 and the final color grading processing is carried out will be described. FIG. 8 is a block diagram illustrating the configuration of the final color grading apparatus 400. The final color grading apparatus 400 differs from the provisional color grading apparatus 300 shown in FIG. 4 in that a recording I/F 402 for inputting/outputting data to the recording medium 112 is provided instead of the external I/F 302, and in that the communication unit 326 is not provided. Aside from these points, the configurations of 404 and 406 to 425 are the same as the configurations of 304 and 306 to 325 shown in FIG. 4, respectively, and thus descriptions thereof will be omitted.

Figure 9:
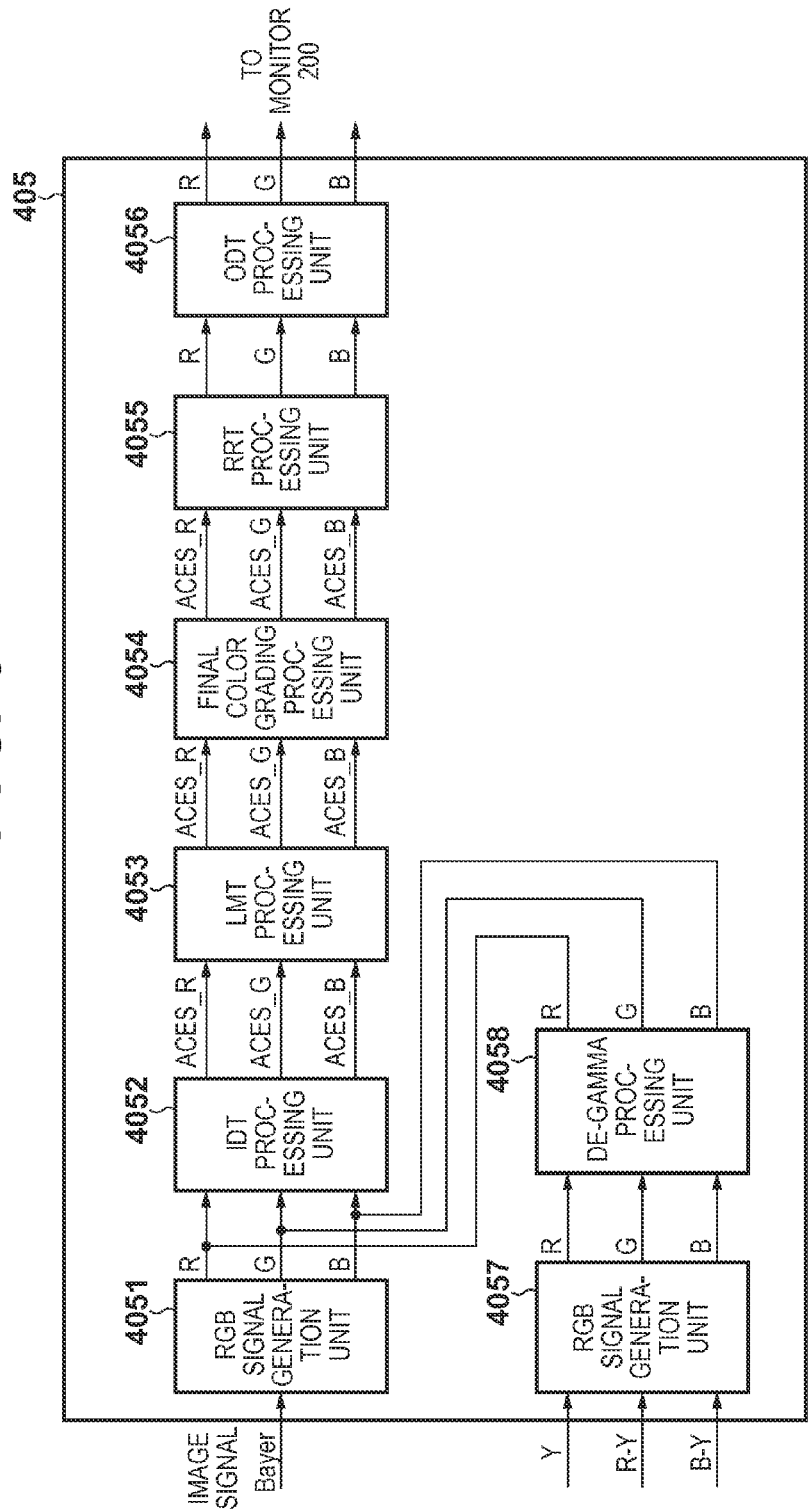
FIG. 9 is a block diagram illustrating a configuration of an image processing unit in the final color grading apparatus according to the first and second embodiments.

Next, processing carried out by an image processing unit 405 of the final color grading apparatus 400 will be described using FIG. 9. FIG. 9 is a block diagram illustrating the image processing unit 405 in detail. Image data recorded in the recording medium 112 by the camera 100 is input via the recording I/F 402. In the present embodiment, Bayer RGB image data or luminance/chrominance signals (Y, R-Y, B-Y) are input.

In the case where the input image data is Bayer RGB image data, the image data is input into an RGB signal generation unit 4051; the RGB signal generation unit 4051 synchronizes the input Bayer RGB signals and generates RGB signals corresponding to the entire pixels.

However, in the case where the input image data is luminance/chrominance signals (Y, R-Y, B-Y), the input image data is input into an RGB signal generation unit 4057. The RGB signal generation unit 4057 converts the luminance/chrominance signals (Y, R-Y, and B-Y signals) into RGB signals and outputs the resulting RGB signals to a de-gamma processing unit 4058. The de-gamma processing unit 4058 performs de-gamma processing, converts the input image data into linear RGB signals, and outputs the linear RGB signals to an IDT processing unit 4052.

The IDT processing unit 4052 converts the input linear RGB signals into ACES_RGB signals. The process for conversion into ACES_RGB signals performed by the IDT processing unit 4052 is configured of color reproducibility correction processing based on the ACES standard and processing for converting into the ACES color space. These conversions are the same as those performed by the IDT processing unit 3052 of the provisional color grading apparatus 300, described earlier.

An LMT processing unit 4053 performs provisional color grading processing in accordance with the provisional color grading parameters 702 written in the metadata 701 of the image file 700 sensed by the camera 100, as will be described later. Specifically, the LMT processing unit 4053 performs 3D-LUT processing. A system controller 450 of the final color grading apparatus 400 obtains the metadata (3D-LUT data) of the loaded image file 700 and sets that metadata as parameters in the LMT processing unit 4053.

A final color grading processing unit 4054 performs final color grading processing on the image data that has undergone the provisional color grading processing, in accordance with user operations made through the operation unit 320. Specifically, the final color grading processing unit 4054 performs processing such as tone curve adjustment on the ACES_RGB signals, in accordance with user operations made through the operation unit 320.

An RRT processing unit 4055 performs correction so that the image takes on a film-tone appearance to serve as a standard, based on the ACES standard. This processing is the same as that performed by the RRT processing unit 3054 of the provisional color grading apparatus 300.

An ODT processing unit 4056 performs color space conversion on the input image signals so that the image signals fall within the color gamut of the monitor 200. This processing too is the same as that performed by the ODT processing unit 3055 of the provisional color grading apparatus 300. The ODT processing unit 4056 outputs the post-conversion RGB signals to an image memory 403. The system controller 450 outputs the image data, which has been output to the image memory 403, to the monitor 200 via an external monitor I/F 406.

Although the foregoing has described operations performed by the image processing unit 405, the final color grading apparatus 400 also differs from the provisional color grading apparatus 300 with respect to operations performed by the system controller 450 when loading an image and performing color grading processing on that image. Next, operations performed when the final color grading apparatus 400 loads an image recorded by the camera 100 and performs the final color grading processing on that image will be described with reference to FIG. 10.

Figure 10:
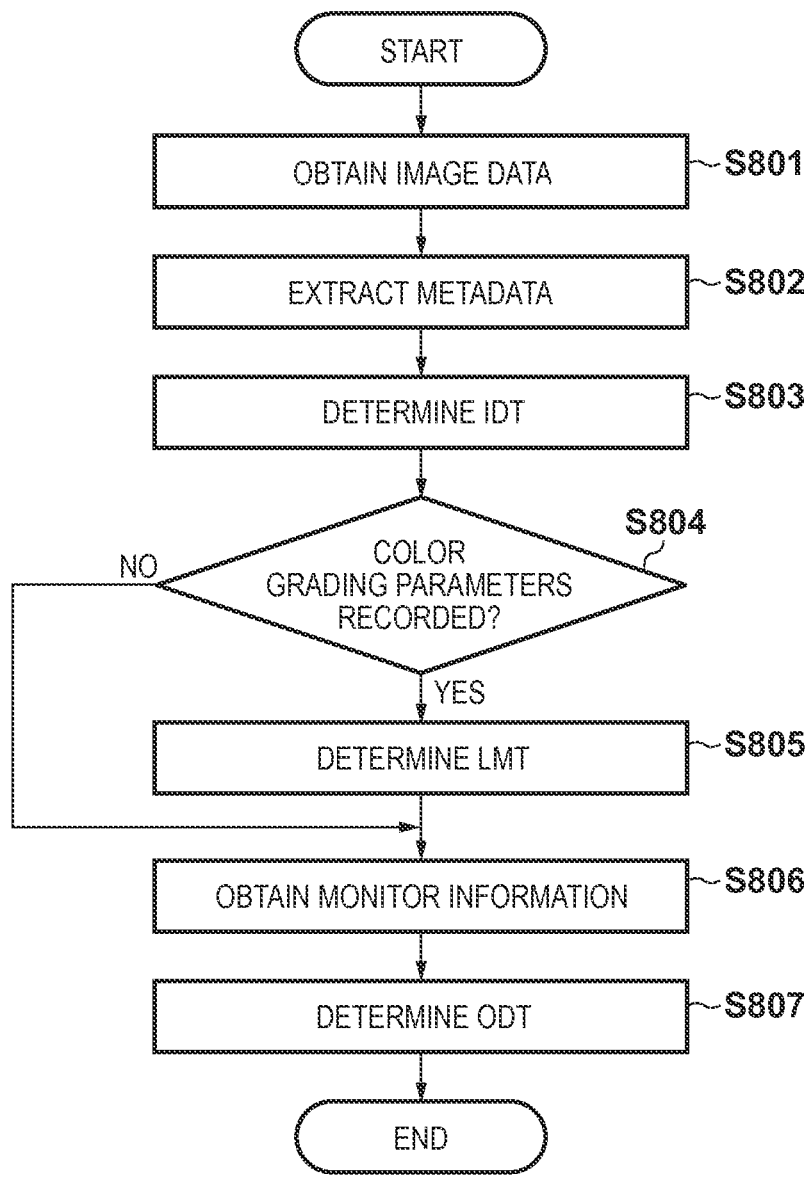
FIG. 10 is a flowchart illustrating processing performed by the final color grading apparatus according to the first embodiment.

In step S801 in FIG. 10, the system controller 450 controls the recording I/F 402 to read out the image file 700 from the recording medium 112 and output the read-out image file 700 to the image memory 403. In step S802, the metadata 701 is extracted from the image file stored in the image memory 403.

In step S803, the IDT parameters are determined based on the image sensing information (the camera model name, the light source information, the lens information, and so on) written in the metadata 701. The method for determining the IDT parameters here is basically the same as the method for determining the IDT parameters performed by the provisional color grading apparatus 300 (S607 in FIG. 6). However, because the input signal is a signal that has undergone a de-gamma process, de-gamma parameters are not necessary.

In step S804, it is determined whether or not the color grading parameters 702 are recorded in the loaded metadata 701. In the case where the color grading parameters 702 are recorded, as shown in FIG. 7, the process advances to step S805, whereas in the case where the color grading parameters 702 are not recorded, the process advances to step S806. In step S805, the loaded color grading parameters (a 3D-LUT, in the present embodiment) are set in the LMT processing unit 4053.

In step S806, information (a display standard) of the connected monitor 200 is obtained. In S807, ODT processing parameters are determined based on the information of the connected monitor 200. The details of the processing performed in steps S806 and S807 are the same as the processing performed by the provisional color grading apparatus 300 (S608 and S609 in FIG. 6).

When the various parameters for the image processing unit 405 are determined as described above, the image processing unit 405 carries out image processing in accordance with those parameters. Meanwhile, the parameters for the final color grading processing unit 4054 are determined through user operations, as described earlier.

As described thus far, according to the present first embodiment, the provisional color grading apparatus 300 generates color grading parameters for a standard state (the ACES color space and color target values), and the generated color grading parameters are transmitted to the camera 100. The configuration is such that the camera 100 then records the color grading parameters with respect to the standard state in association with the image data.

Meanwhile, in the final color grading apparatus 400, a loaded image is first converted by the IDT processing unit 4052 into the standard state (the ACES standard color space and color target values). The provisional color grading processing is then carried out in accordance with the provisional color grading parameters for the standard state. The configuration is also such that the final color grading is carried out on the post-provisional color grading image. In this manner, the color grading parameters with respect to the standard state are passed on. As a result, the color grading performed during image sensing can be reproduced after image sensing and recording even in the case where the state of the image recorded on the recording medium 112 (for example, Bayer RGB) is different from the state of the image input into the provisional color grading apparatus 300 (for example, luminance/chrominance signals Y, R-Y, B-Y).

Although the first embodiment describes the ACES standard as an example of the standard state, it should be noted that any format aside from the ACES standard may be used as long as it is a format can be converted according to a given standard state or generates color grading parameters. For example, the color grading parameters may be generated using, for example, the Adobe RGB color space so as to faithfully reproduce the colors of the subject, and those parameters may then be recorded in the metadata.

In addition, although the RRT processing unit 3054, the ODT processing units 3055 and 4056, and so on are provided in the first embodiment in order to conform to the ACES standard, these processes need not be carried out if a standard state aside from ACES is employed. For example, a configuration in which only a process for converting into the Rec. 709 color gamut is carried out is also possible.

In addition, the first embodiment describes a case in which the provisional color grading parameters are recorded as the metadata of a sensed image as an example. However, the present invention is not limited thereto, and the provisional color grading parameters may be recorded in any format aside from metadata as long as the parameters are associated with the sensed image. For example, the provisional color grading apparatus 300 may generate the provisional color grading parameters as a file, and link information linking to the provisional color grading parameter file may be passed to the camera 100. The configuration can be such that the camera 100 records the link information linking to the provisional color grading parameter file as the metadata of the sensed image.

Specifically, the provisional color grading apparatus 300 generates the provisional color grading parameter file and assigns a unique ID number to that provisional color grading file. It is then possible to employ a method in which the provisional color grading file ID is transmitted to the camera 100 and the camera 100 records the provisional color grading file ID number as the metadata of the sensed image. Alternatively, the configuration may be such that the provisional color grading apparatus 300 transmits the provisional color grading parameter file to an external server via the communication unit 326 and records URL information or the like of the destination server as the metadata of the recorded image.

Meanwhile, rather than recording only the provisional color grading parameters, it is possible to write the provisional color grading processing itself in image processing description language (that is, as a program) and associate that program file with image data. For example, Color Transform Language (CTL), proposed by the Academy of Motion Picture Arts and Sciences (AMPAS), can be employed as the image processing description language. It is also possible to employ a configuration in which the CTL file itself is recorded in the image data as the metadata.

Second Embodiment

Next, a second embodiment of the present invention will be described. The second embodiment describes an exemplary case where IDT, ODT, and monitor information is added to the image data and recorded in addition to the provisional color grading parameters when the camera 100 records an image. Note that the system configuration, the configurations of the various units, and the basic operations in the second embodiment are the same as those described with reference to FIGS. 1 to 5, 8, and 9, and thus descriptions thereof will be omitted here. A communication sequence carried out between the camera 100 and the provisional color grading apparatus 300 during image sensing in the second embodiment partially differs from that in the first embodiment. Hereinafter, the communication sequence carried out between the camera 100 and the provisional color grading apparatus 300 during image sensing will be described with reference to FIG. 11.

Figure 11:
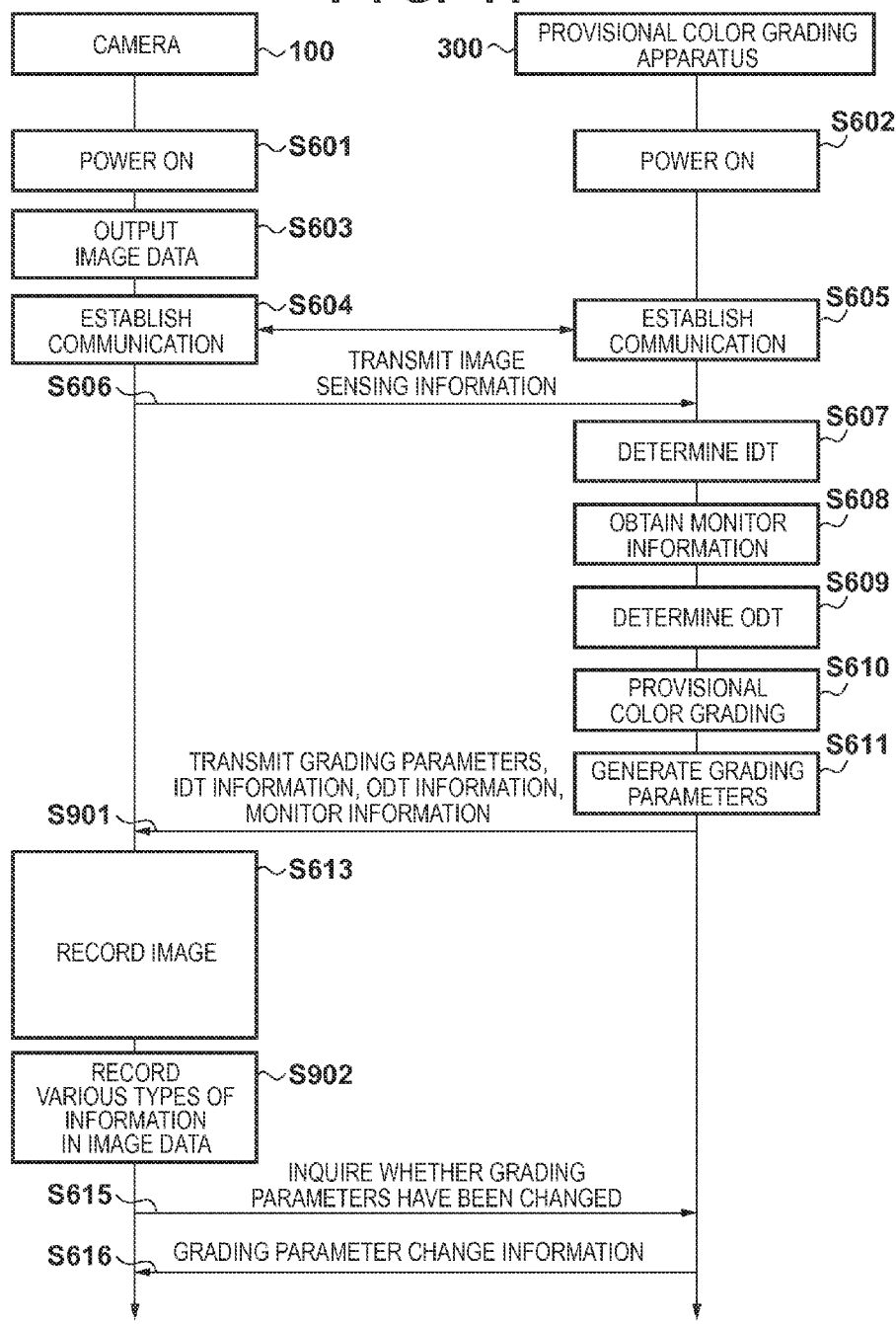
FIG. 11 is a sequence chart illustrating a flow of communication between the digital camera and the provisional color grading apparatus, and the flow of an image sensing process, according to the second embodiment.

FIG. 11 is a sequence chart illustrating the flow of communication between the camera 100 and the provisional color grading apparatus 300, and the flow of an image sensing process, from when those devices are turned on to when image sensing is carried out, according to the second embodiment. The processes of S601 to S611 in FIG. 11 are the same as the processes in FIG. 6 that have the same reference numerals, and thus detailed descriptions thereof will be omitted. Briefly, communication is established between the camera 100 and the provisional color grading apparatus 300, and the provisional color grading apparatus 300 determines IDT information, the monitor information, the provisional color grading parameters, and ODT information.

Next, in S901, the generated IDT information, ODT information, monitor information, and provisional color grading parameters are transmitted to the camera 100. Here, the "IDT information" refers to IDT parameters determined by the provisional color grading apparatus 300 or an ID number for determining the IDT parameters. The second embodiment describes a case where the IDT information is an ID number for specifying the IDT as an example. The "ODT information", meanwhile, refers to the determined ODT parameters or ID information specifying the details of ODT processing. The second embodiment describes a case where the ODT information is an ID number for specifying the ODT as an example. The "monitor information" refers to a model name of the monitor or standard information of the monitor (for example, DCI, Rec. 709, or the like). The second embodiment describes a case where the monitor information is standard information of the monitor as an example.

In S613, the camera 100 records an image. When the image has been recorded, the procedure advances to S902, where the IDT information, ODT information, monitor information, and color grading parameter information obtained in S901 are recorded as metadata of the image data.

Figure 12:
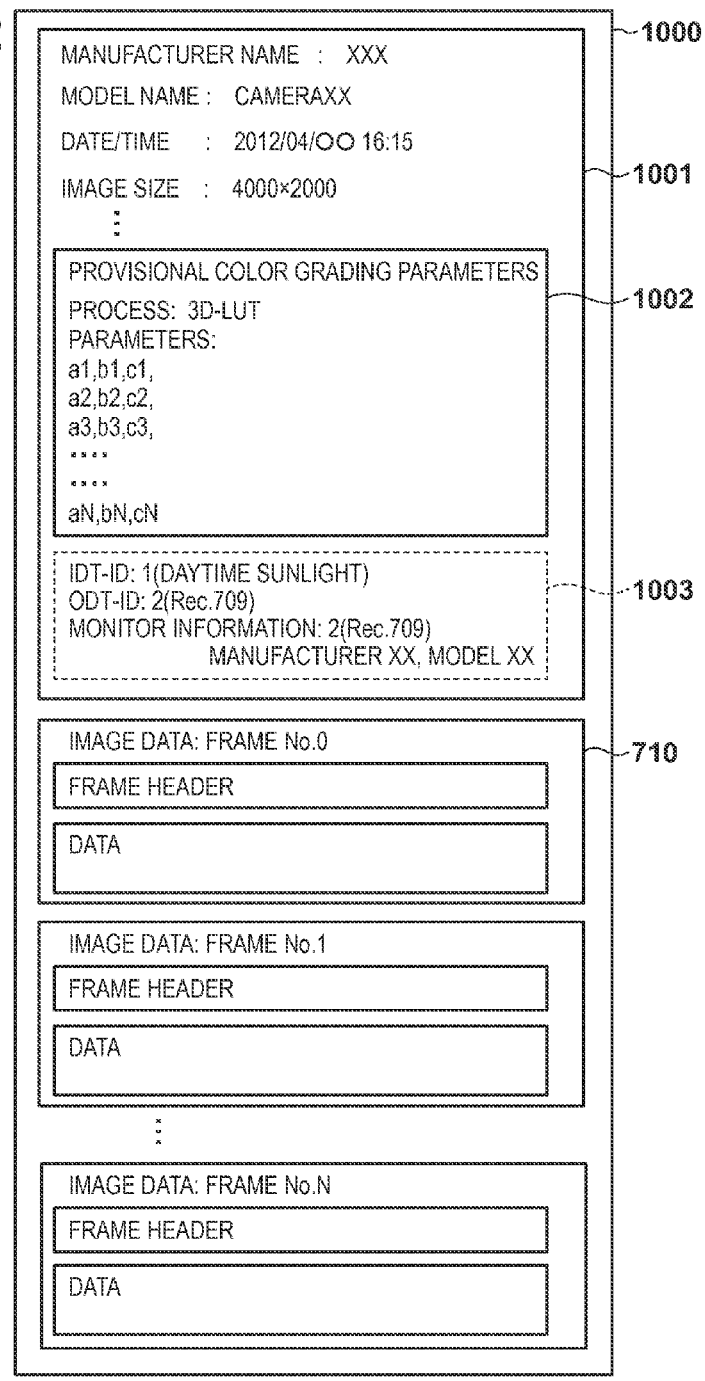
FIG. 12 is a block diagram illustrating an example of a structure of an image file according to the second embodiment.

An example of the metadata recorded in the second embodiment is shown in FIG. 12. FIG. 12 illustrates the structure of a file recorded by the camera 100. Note that in FIG. 12, elements that are the same as those shown in FIG. 7 are given the same reference numerals. In the present second embodiment, an image file 1000 contains metadata 1001 including color grading parameters 1002, and the image frame data 710. In addition to the structure shown in FIG. 7, the metadata 1001 contains IDT information, ODT information, and monitor information 1003. As an example of the information 1003, IDT and ODT ID numbers, a monitor display standard number, and manufacturer and model names of the monitor are recorded.

Returning to FIG. 11, in S615 and S616, the same processes as those described with reference to FIG. 6 are carried out. Meanwhile, although not indicated in FIG. 11, image sensing information indicating changes in the image sensing conditions of the camera 100 (the light source and the like) are transmitted to the provisional color grading apparatus 300 in the case where such changes have occurred, in addition to the aforementioned information. The provisional color grading apparatus 300 then determines the IDT information corresponding to the new image sensing information (light source) and transmits the updated IDT information to the camera 100.

Figure 13:
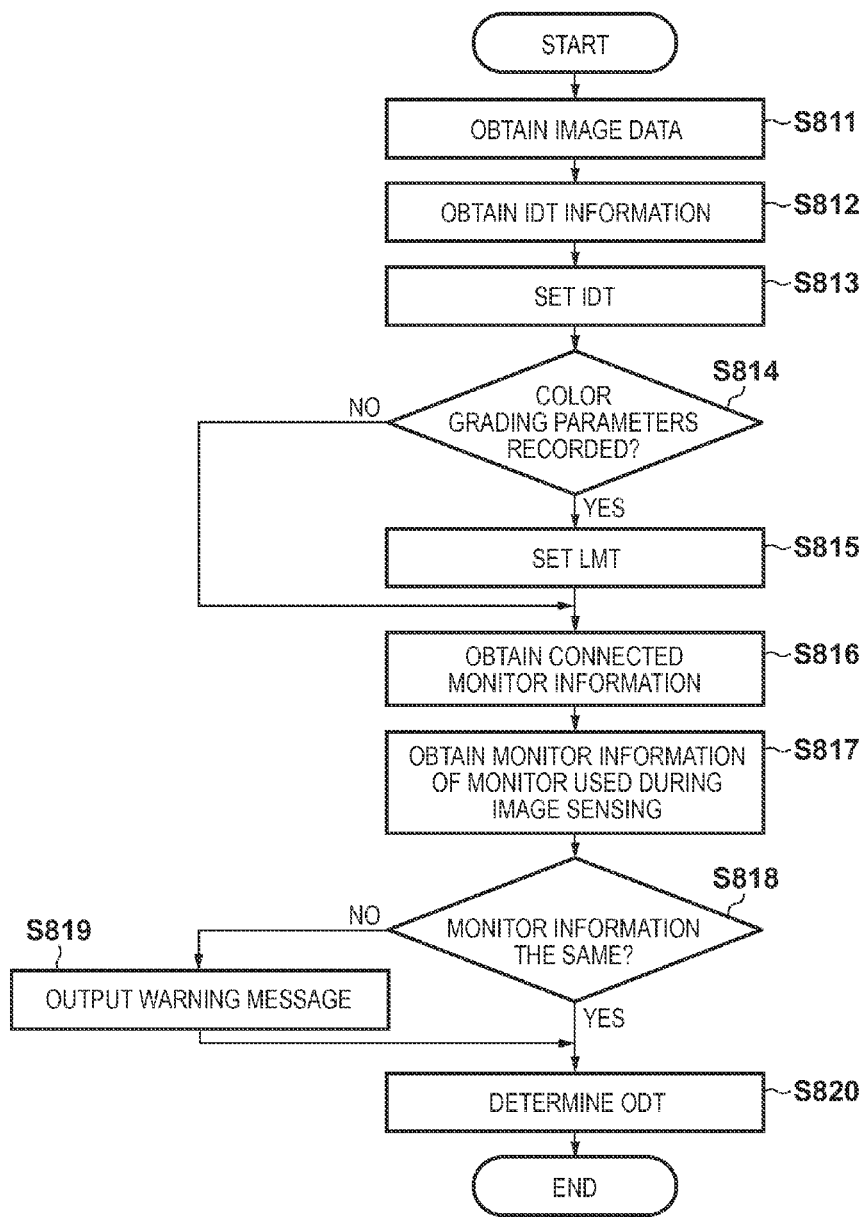
FIG. 13 is a flowchart illustrating processing performed by the final color grading apparatus according to the second embodiment.

Next, operations performed when the final color grading apparatus 400 loads an image recorded by the camera 100 as described above and performs the final color grading processing on that image will be described with reference to FIG. 13. In step S811 in FIG. 13, the system controller 450 controls the recording I/F 402 to read out the image file 1000 from the recording medium 112 and output the read-out image file 1000 to the image memory 403. In step S812, the IDT information is obtained from the metadata 1001 of, for example, the image file 1000, which has the structure illustrated in FIG. 12.

In step S813, IDT parameters based on the obtained IDT information are set in the IDT processing unit 4052. For example, in the case where an ID number indicating "daytime sunlight" is recorded as the IDT information, preprepared IDT information corresponding to daytime sunlight is selected and the parameters thereof are set in the IDT processing unit 4052.

The processes of steps S814 and S815 are the same as those in steps S804 and S805 indicated in FIG. 10 and described in the first embodiment, and in the case where the provisional color grading parameters are recorded as the metadata, those parameters are set in the LMT processing unit 4053.

In step S816, information of the monitor 200 connected to the final color grading apparatus 400 (a model name, a standard) is obtained. In step S817, the monitor information present during the image sensing is obtained from the metadata 1001 of the image file 1000. In step S818, the monitor information of the monitor connected to the final color grading apparatus 400 is compared with the monitor information present during the image sensing, and it is determined whether the monitor standard names (Rec. 709, DCI, or the like) match. The procedure advances to step S820 in the case where the standard names match, and advances to step S819 in the case where the standard names do not match.

In step S819, a message warning that a monitor (or mode) of a different standard than that used in the provisional color grading performed during image sensing is output to the monitor 200. In step S820, ODT information is determined based on the standard (or mode) of the monitor 200 connected to the final color grading apparatus 400, and the ODT parameters are set in the ODT processing unit 4056.

The foregoing has described a flow for determining parameters for the image processing unit 305 in the final color grading apparatus 400. Operations performed when carrying out the final color grading processing in accordance with the parameters set as described above are the same as those performed in the first embodiment, and thus descriptions thereof will be omitted.

According to the second embodiment described thus far, the IDT information, ODT information, and monitor information is transmitted to the camera 100 in addition to the provisional color grading parameters generated by the provisional color grading apparatus 300. The provisional color grading parameters and IDT information, ODT information, and monitor information received by the camera 100 are recorded as the metadata in association with the image data. It is thus possible to reduce the occurrence of a situation in which the incorrect IDT, monitor, or the like is used during the final color grading and the provisional color grading performed during image sensing cannot be reproduced as a result.

Although the second embodiment describes an exemplary case in which the IDT information, ODT information, and monitor information are recorded as the metadata in addition to the provisional color grading parameters, it should be noted that it is not absolutely necessary to communicate all of the IDT information, ODT information, and monitor information. For example, a configuration in which only the IDT information is received from the camera 100 and recorded may be employed.

Third Embodiment

Next, a third embodiment of the present invention will be described. The third embodiment describes a case where the camera 100 outputs a post-IDT processing image to the provisional color grading apparatus 300 as an example. Note that the system configuration, the configurations of the various units, and the basic operations in the third embodiment are the same as those described in the first embodiment with reference to FIGS. 1, 2, 4, 8, and 9, and thus descriptions thereof will be omitted here. In the third embodiment, the configuration of the image processing unit 105 of the camera 100 and the configuration of the image processing unit 305 of the provisional color grading apparatus 300 are partially different from those in the first embodiment.

Figure 14:
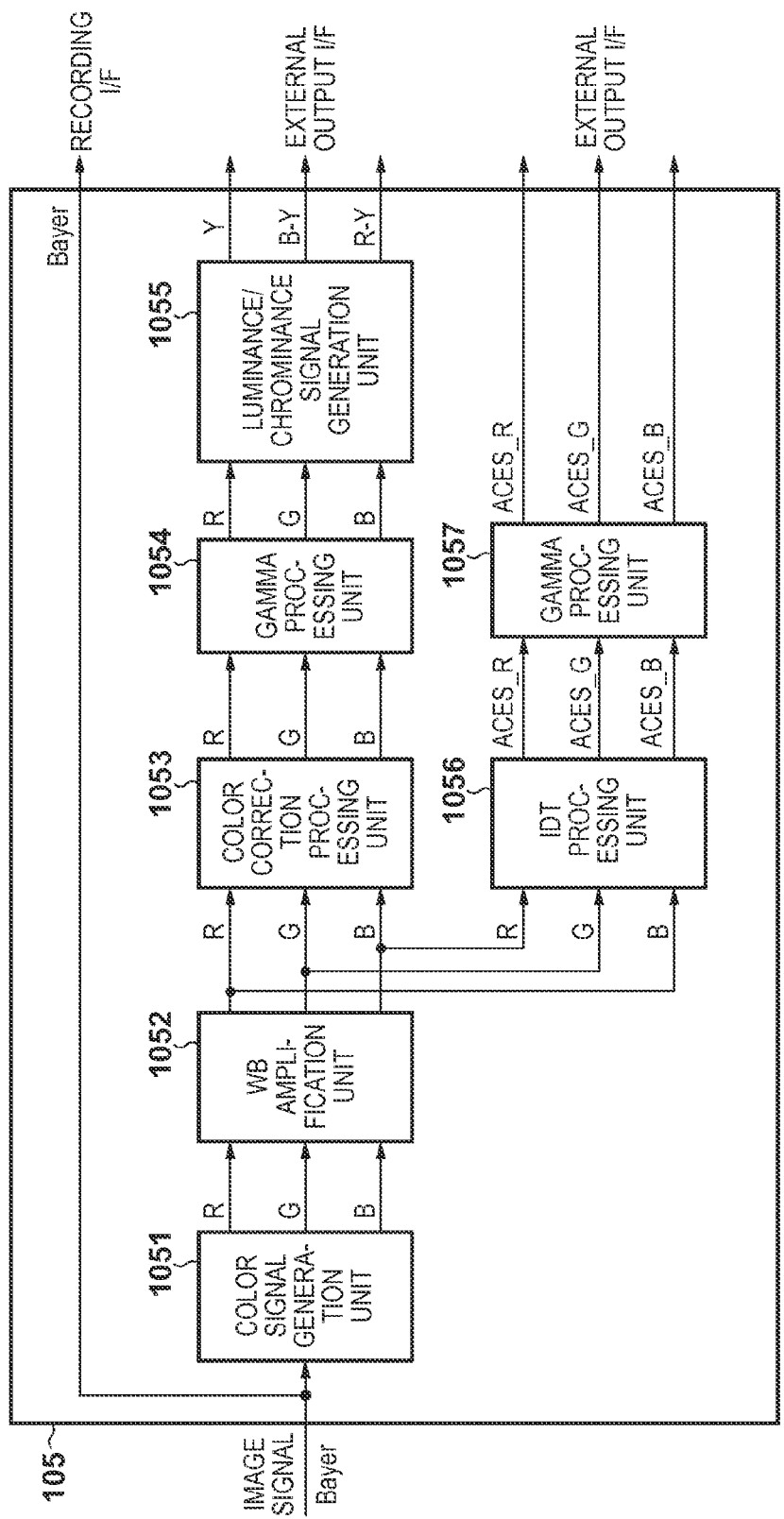
FIG. 14 is a block diagram illustrating a configuration of an image processing unit in a digital camera according to a third embodiment.

FIG. 14 is a block diagram illustrating the configuration of the image processing unit 105 of the camera 100 shown in FIG. 3, according to the present third embodiment. Blocks in FIG. 14 that have the same reference numerals as those in FIG. 3 are the same as the blocks in FIG. 3, and thus descriptions thereof will be omitted. The configuration illustrated in FIG. 14 adds an IDT processing unit 1056 and a gamma processing unit 1057 to the configuration illustrated in FIG. 3. The image signal processed by the WB amplification unit 1052 is output to the color correction processing unit 1053 or the IDT processing unit 1056. Which of the color correction processing unit 1053 and the IDT processing unit 1056 to output the image signal to is determined by user operations made through the operation unit 120.

The IDT processing unit 1056 converts input RGB signals into ACES standard RGB signals. Specifically, the IDT processing unit 1056 performs processing for correcting the signals to ACES standard color target values and converting the signals to the ACES standard color space. The generated ACES standard RGB signals are output to the gamma processing unit 1057. The gamma processing unit 1057 applies gamma processing such as logarithmic gamma encoding and conversion to integer values to the input ACES standard RGB signals, and outputs the integer ACES_RGB signals to the external output I/F 113.

Figure 15:
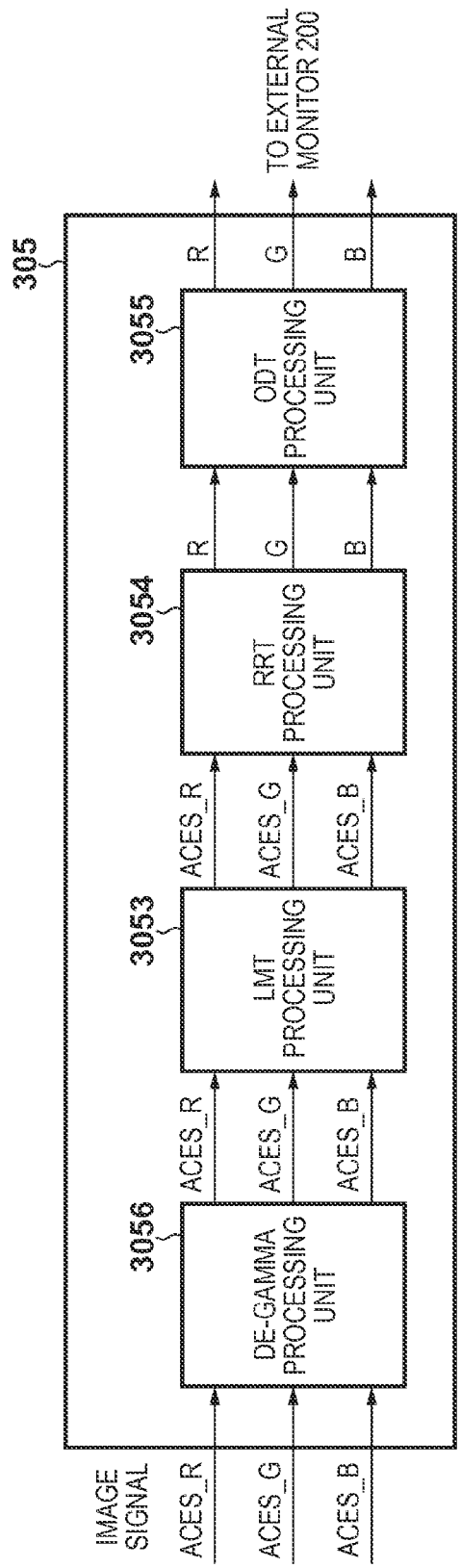
FIG. 15 is a block diagram illustrating a configuration of an image processing unit in a provisional color grading apparatus according to the third embodiment.

Next, a flow of processing by which the provisional color grading apparatus 300 processes the image data output from the camera 100 will be described. FIG. 15 is a block diagram illustrating the configuration of the image processing unit 305 of the provisional color grading apparatus 300 according to the third embodiment. In FIG. 15, elements having the same reference numerals as those in FIG. 5 execute the same processes as those described in the first embodiment.

When the ACES standard RGB signals are input into the image processing unit 305, a de-gamma processing unit 3056 applies the inverse of the gamma processing applied by the gamma processing unit 1057 of the camera 100 as described earlier, and converts the integer ACES data into floating-point ACES data. The post-conversion ACES standard RGB data is output to the LMT processing unit 3053. The processing from the LMT processing unit 3053 to the ODT processing unit 3055 is the same as the processing described in the first embodiment, and thus descriptions thereof will be omitted.

Next, a communication sequence carried out between the camera 100 and the provisional color grading apparatus 300 during image sensing according to the third embodiment will be described. FIG. 16 is a sequence chart illustrating the flow of communication between the camera 100 and the provisional color grading apparatus 300, and the flow of an image sensing process, from when those devices are turned on to when image sensing is carried out, according to the third embodiment. The processes of S601 to S605 in FIG. 16 are the same as the processes in FIG. 6 that have the same reference numerals, and thus detailed descriptions thereof will be omitted. Briefly, communication is first established between the camera 100 and the provisional color grading apparatus 300. In the third embodiment, IDT processing is performed by the camera 100, and thus the IDT setting processing equivalent to S606 and S607 in the first embodiment is not carried out.

The processing from S608 to S611 is the same as the processing described in the second embodiment. Briefly, the provisional color grading apparatus 300 determines the monitor information, the provisional color grading parameters, and the ODT information. The monitor information and ODT information referred to here are the same as in the second embodiment.

Next, in S1301, the generated ODT information and monitor information are transmitted to the camera 100. In S613, the camera 100 records an image. When the image has been recorded, the procedure advances to S1302, where the ODT information, monitor information, and color grading parameter information obtained in S1301 are recorded as metadata of the image data. Meanwhile, IDT processing information used in the processing performed by the image processing unit 105 of the camera 100 (in the third embodiment, an ID number specifying the IDT) is recorded. Note that the recorded metadata is the same as the metadata indicated in FIG. 12 and described in the second embodiment.

Operations through which the final color grading apparatus 400 processes the image data recorded as described above are the same as in the second embodiment, and thus descriptions thereof will be omitted.

According to the third embodiment described thus far, the IDT processing is carried out by the camera 100, and the post-IDT image is output to the provisional color grading apparatus 300. The provisional color grading apparatus 300 transmits the generated provisional color grading parameters, ODT information, and monitor information to the camera 100. The provisional color grading parameters and IDT information, ODT information, and monitor information received by the camera 100 are recorded as the metadata in association with the image data. It is thus possible to output provisional color grading parameters used in the provisional color grading processing from the standard state (that is, post-IDT processing), even in the case where the provisional color grading apparatus 300 does not have the IDT parameter information of the camera 100.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-261628, filed on Nov. 29, 2012 which is hereby incorporated by reference herein in its entirety.

What is claimed is:

1. An image capturing apparatus comprising:
an image sensor configured to sense an image and output image data;
a transmitter configured to transmit the image data to an external image processing apparatus;
a receiver configured to receive processing information used in image processing performed by the external image processing apparatus on the image data, wherein the image processing includes first image processing that converts the image data into standard image data defined in a predetermined color space and second image processing that is performed on the standard image data in accordance with an operation by a user; and
a recorder configured to record in an image file the processing information in association with the image data that has not been processed by the external image processing apparatus,
wherein the processing information is information about the second image processing,
wherein, in a case where content of the second image processing performed by the external image processing apparatus is changed, the receiver receives processing information corresponding to the changed second image processing from the external image processing apparatus, and
wherein, upon receiving the processing information corresponding to the changed second image processing, the recorder creates a new image file and records in the created image file the processing information in association with the image data.

2. The image capturing apparatus according to claim 1, wherein the recorder records the processing information as appended information of the image data.

3. The image capturing apparatus according to claim 1, wherein the processing information is link information indicating a link to a file containing parameters used in the image processing performed by the external image processing apparatus on the standard image data.

4. The image capturing apparatus according to claim 1, wherein the processing information is a program of the image processing to be performed by the external image processing apparatus on the standard image data.

5. The image capturing apparatus according to claim 1, wherein the standard image data is based on the Academy Color Encode Specification (ACES) standard.

6. The image capturing apparatus according to claim 1, wherein the processing information is a three-dimensional look-up table.

7. An image processing apparatus comprising:
a reader configured to read out the processing information and the image data recorded into the recorder by the image capturing apparatus according to claim 1;
a converter configured to convert the image data into standard image data based on a standard;
a first image processor configured to perform the same processing as the processing performed by the external image processing apparatus on the image data, on the standard image data obtained through the conversion performed by the converter, based on the processing information; and
a second image processor configured to perform image processing based on a designation from a user on the image data processed by the first image processor.

8. The image processing apparatus according to claim 7, further comprising a transmitter configured to transmit the image data processed by the second image processor to a display device.

9. A control method for an image capturing apparatus including an image sensor configured to sense an image and output image data, the method comprising:
transmitting the image data to an external image processing apparatus;
receiving processing information used in image processing performed by the external image processing apparatus on the image data; and
recording in an image file the processing information in association with the image data that has not been processed by the external image processing apparatus,
wherein the image processing includes first image processing that converts the image data into standard image data defined in a predetermined color space and second image processing that is performed on the converted image data in accordance with an operation by a user, and
wherein the processing information is information used in about the second image processing,
wherein, in a case where content of the second image processing performed by the external image processing apparatus is changed, processing information corresponding to the changed second image processing is received from the external image processing apparatus, and
wherein, upon receiving the processing information corresponding to the changed second image processing, a new image file is created and the processing information is recorded in the created image file in association with the image data.

* * * * *